United States Patent [19]

Jenkins et al.

[11] Patent Number: 5,401,802
[45] Date of Patent: Mar. 28, 1995

[54] POLYMERS CONTAINING COMPLEX HYDROPHOBIC GROUPS

[75] Inventors: Richard D. Jenkins, Hurricane; David R. Bassett, Charleston, both of W. Va.; Gregory D. Shay, Cary, N.C.

[73] Assignee: Union Carbide Chemicals & Plastics Technology Corporation, Danbury, Conn.

[21] Appl. No.: 251,521

[22] Filed: May 31, 1994

Related U.S. Application Data

[62] Division of Ser. No. 163,485, Dec. 7, 1993, Pat. No. 5,352,734, which is a division of Ser. No. 887,641, May 29, 1992, Pat. No. 5,292,828.

[51] Int. Cl.$^6$ ............................................. C08L 79/00
[52] U.S. Cl. ..................................... 524/845; 524/819; 524/832
[58] Field of Search .................... 524/845, 819, 832

[56] References Cited

U.S. PATENT DOCUMENTS

| | | | |
|---|---|---|---|
| 33,156 | 1/1990 | Shay et al. | 526/301 |
| 3,035,004 | 5/1962 | Glavis | 260/29.7 |
| 3,190,925 | 6/1965 | Stowe | 260/611 |
| 3,277,157 | 10/1966 | Stewart et al. | 260/486 |
| 3,341,627 | 9/1967 | Wilkinson | 260/898 |
| 3,499,876 | 3/1970 | Field et al. | 260/78.5 |
| 3,652,497 | 3/1972 | Junas et al. | 260/47 |
| 3,657,175 | 4/1972 | Zimmerman | 260/29.6 |
| 3,794,608 | 2/1974 | Evani et al. | 260/29.6 |
| 3,894,980 | 7/1975 | DeTommaso | 260/29.6 |
| 3,896,161 | 7/1975 | Borden et al. | 260/486 |
| 3,915,921 | 10/1975 | Schlatzer, Jr. | 260/17.4 |
| 3,940,351 | 2/1976 | Schlatzer, Jr. | 260/17.4 |
| 3,960,935 | 6/1976 | Semour | 260/485 |
| 4,008,202 | 2/1977 | Evani et al. | 260/47 |
| 4,075,411 | 2/1978 | Dickstein | 560/224 |
| 4,079,028 | 3/1978 | Emmons et al. | 260/29.6 |
| 4,085,167 | 4/1978 | Lewis et al. | 260/885 |
| 4,128,520 | 12/1978 | Barabas et al. | 260/29.7 |
| 4,138,381 | 2/1979 | Chang et al. | 260/29.6 |
| 4,155,892 | 5/1979 | Emmons et al. | 260/29.2 |
| 4,167,502 | 9/1979 | Lewis et al. | 260/29.6 |
| 4,226,754 | 10/1980 | Yun et al. | 260/29.6 |
| 4,228,277 | 10/1980 | Landoll | 536/90 |
| 4,230,844 | 10/1980 | Chang et al. | 526/210 |
| 4,268,641 | 5/1981 | Koenig et al. | 525/367 |
| 4,338,239 | 7/1982 | Dammann | 524/549 |
| 4,384,096 | 5/1983 | Sonnabend | 526/313 |
| 4,395,524 | 7/1983 | Emmons et al. | 526/307.2 |
| 4,421,902 | 12/1983 | Chang et al. | 526/317 |
| 4,423,199 | 12/1983 | Chang et al. | 526/307.6 |
| 4,426,485 | 1/1984 | Hoy et al. | 524/591 |
| 4,429,097 | 1/1984 | Chang et al. | 526/317 |
| 4,463,151 | 7/1984 | Schutz et al. | 526/307.5 |
| 4,464,524 | 8/1984 | Karickhoff | 526/313 |
| 4,485,209 | 11/1984 | Fan et al. | 524/801 |
| 4,496,708 | 1/1985 | Dehm et al. | 528/76 |
| 4,509,949 | 4/1985 | Huang et al. | 586/558 |
| 4,514,552 | 4/1985 | Shay et al. | 526/301 |

(List continued on next page.)

FOREIGN PATENT DOCUMENTS 2745872 10/1979 Germany .
62-270608 11/1987 Japan .

OTHER PUBLICATIONS

Jenkins, R. D. et al., Associative Polymers with Novel Hydrophobe Structures, ACS Meeting, New York, N.Y., Aug. 26, 1991.
Nemoto, H. et al., J. Org. Chem., 1992, 57, 435.
U.S. patent application Ser. No. 07/304,258 (D-15741), filed Jan. 31, 1989.

Primary Examiner—Joseph L. Schofer
Assistant Examiner—N. Sarofim
Attorney, Agent, or Firm—G. L. Coon

[57] ABSTRACT

Water-soluble polymers are disclosed which comprise hydrophobic segments, each segment containing at least one hydrophobic group or comlex hydrophobic group covalently bonded to the polymer, wherein the polymer has an amount of complex hydrophobic groups sufficient to provide for enhanced thickening of aqueous solutions containing the polymer. These polymers provide superior thickening and leveling in aqueous systems through hydrophobic associations, and aid suspension of particulate materials in non-aqueous systems.

19 Claims, No Drawings

U.S. PATENT DOCUMENTS

| | | | |
|---|---|---|---|
| 4,569,965 | 2/1986 | Engel et al. | 524/544 |
| 4,600,761 | 7/1986 | Ruffner et al. | 526/270 |
| 4,616,074 | 10/1986 | Ruffner | 526/318 |
| 4,703,080 | 10/1987 | Shay et al. | 524/555 |
| 4,722,962 | 2/1988 | Shay et al. | 524/548 |
| 4,735,981 | 4/1988 | Rich et al. | 524/247 |
| 4,764,554 | 8/1988 | Tonge | 524/558 |
| 4,801,671 | 1/1989 | Shay et al. | 526/214 |
| 4,916,183 | 7/1990 | Barron et al. | 524/555 |
| 4,939,283 | 7/1990 | Yokota et al. | 558/33 |
| 5,006,596 | 4/1991 | Chen et al. | 524/555 |
| 5,015,711 | 5/1991 | Simonet et al. | 526/301 |
| 5,023,309 | 6/1991 | Kruse et al. | 528/49 |

POLYMERS CONTAINING COMPLEX HYDROPHOBIC GROUPS

This application is a Division of prior U.S. application Ser. No. 08/163,485, filed Dec. 7, 1993, now U.S. Pat. No. 5,352,734 and/which is a Divisional of application Ser. No. 07/887,641, May 29, 1992, now U.S. Pat. No. 5,292,828.

Related Applications

The following are related, commonly assigned applications, filed on an even date herewith:

U.S. Pat. application Ser. No. 07/887,647 now U.S. Pat. No. 5,292,843; U.S. Pat. application Ser. No. 07/887,646; U.S. Pat. application Ser. No. 07/887,642; U.S. Pat. application Ser. No. 07/887,673; U.S. Pat. application Ser. No. 07/887,672; U.S. Pat. application Ser. No. 07/887,645; U.S. Pat. application Ser. No. 07/887,648; U.S. Pat. application Ser. No. 07/887,643; U.S. Pat. application Ser. No. 07/887,644; and U.S. Pat. application Ser. No. 07/887,671 now abandoned; all of which are incorporated herein by reference.

BRIEF SUMMARY OF THE INVENTION

Technical Field

This invention relates to water-soluble polymers which comprise hydrophobic segments, each segment containing at least one hydrophobic group or complex hydrophobic group covalently bonded to the polymer, wherein the polymer has an amount of complex hydrophobic groups sufficient to provide for enhanced thickening of aqueous solutions containing the polymer.

BACKGROUND OF THE INVENTION

A great variety of polymeric materials, natural and synthetic, have been disclosed to be useful thickening agents, yet only a few of these materials find commercial use today. Many of those which are used commercially, such as hydroxyethyl cellulose or methyl cellulose, do not provide both the thickening power required as well as the flow and leveling desired in the formulation. Consequently, in order to meet the market demands for improved paint formulations, it is important to find a new materials which will provide the above combination of properties.

DISCLOSURE OF THE INVENTION

This invention relates to water-soluble polymers which comprise hydrophobic segments, each segment containing at least one hydrophobic group or complex hydrophobic group covalently bonded to the polymer, wherein the polymer has an amount of complex hydrophobic groups sufficient to provide for enhanced thickening of aqueous solutions containing the polymer. The polymers can also have an amount of bunching, defined as hydrophobic segments comprising at least two hydrophobic groups, complex hydrophobic groups or mixtures thereof, which can provide for enhanced thickening of aqueous solutions containing the polymer. Processes for the production and use of such polymers are also described.

DETAILED DESCRIPTION

It has been found that good thickening and leveling properties in waterborne coatings can be achieved without tailor-making the polymeric backbone structure. Effective thickening and leveling properties can be introduced into waterborne coating systems without the necessity of providing polymeric backbones of unique structures other than providing those polymers with the capacity to be dissolved in water to the degree necessary for the application at hand. It has been found that all that is necessary to provide synthetic, water-soluble thickeners most desirable for use in waterborne coating Systems is the introduction to a water-soluble polymeric backbone of special hydrophobic groups, hereinafter referred to as complex hydrophobes or complex hydrophobic groups. One achieves through these complex hydrophobic groups an interaction and interconnection of the various dissolved water-soluble polymers. This interaction and interconnection results in an associative crosslinking of these polymers such that within the aqueous phase they form a network resulting in a unique thickening action, and also provide extremely good flow and leveling properties. It is believed that the unique polymers of this invention provide good thickening and leveling properties to a waterborne system by hydrophobic association.

The important features of hydrophobic association include: (a) no particle-to-polymer interactions required for thickening to take place (for example, the polymers of this invention have the capacity of thickening pure water); (b) interaction of the hydrophobic and complex hydrophobic groups provides a capacity to effectively crosslink the polymers sufficiently to cause an increase in the viscosity and hence achieve the desired thickening characteristics; (c) under shear conditions, the viscosity of the aqueous phase of the waterborne systems can decrease; and (d) upon removal of shear force, there is a time-dependent rebuilding of theological properties. This time dependence provides the consequent good flow and leveling characteristics which are sought in waterborne coating systems.

As indicated above, hydrophobic association is based upon the existence within the aqueous phase of intermolecular associations between the hydrophobic and complex hydrophobic groups bonded to the water-soluble polymer. In the broadest characterization, hydrophobic association is intended to mean the approximate aggregation of at least two hydrophobic groups, complex hydrophobic groups or mixtures serving to exclude water at that proximity. Hydrophobic association can be looked at as a congregation of hydrophobic groups, complex hydrophobes or mixtures which locally excludes water. These hydrophobic groups associations are dynamic, molecular, hydrophobic associations, which occur in aqueous solution. These associations occur only in abundance above a critical concentration, i.e., the critical micelle concentration, CMC. CMC can be defined as the amount of hydrophobe or complex hydrophobe containing compound which is required to saturate a solution at standard conditions, such that the addition of any more hydrophobe or complex hydrophobe containing compound will produce a phase separation on a molecular level resulting in the formation of micelle-like associations. As such, at a concentration above the CMC, the amount of free hydrophobe or complex hydrophobe containing compound, i.e., having unassociated hydrophobes or complex hydrophobes, in solution will not increase. The time averaged, i.e., equilibrium, number and size of hydrophobic associations are constant at constant conditions, such as temperature, concentration, ionic strength and the like. The duration of time that an individual hydrophobic association exists is related to the (1) chemical potential of the hydrophobe and complex hydrophobe as compared to its (aqueous) environment and (2) steric factors, such as the proximity of one hydrophobe or complex hydrophobe to another, which aid and abet the approach of two or more hydrophobes or complex hydrophobes to each other. The chemical potential of the hydrophobe and complex hydrophobe, $\Delta\mu$, can be roughly estimated by the equation:

$$\Delta\mu = 2RT - \frac{V_s + V_p}{2}(\delta_s - \delta_p)^2 x^2 \qquad (I)$$

wherein R is the universal gas constant; T is temperature in degrees Kelvin; $V_s$ and $V_p$ are the molar volumes of the solvent (water) and the hydrophobe or complex hydrophobe respectively; $\delta_s$ and $\delta_p$ are the solubility parameters of the solvent (water) and hydrophobe or complex hydrophobe respectively; and x is the volume fraction concentration of hydrophobe or complex hydrophobe present. This chemical potential equation can be deduced from the theory of the solubility of liquids in liquids as presented in The Solubility of Non-Electrolytes, by J. H. Hildebrand and R. L. Scott at page 253, published by Dover Publication, Inc., New York, N.Y. (1964). The more negative the value of $\Delta\mu$, the stronger the propensity to form and maintain hydrophobic associations. Thus, strong hydrophobic associations are possible where there is a large disparity between the molar volumes of the solvent (water) and the hydrophobe and complex hydrophobe, as well as a large difference between the solubility parameters. Weak associations occur when only slight differences between these two factors exist. When the chemical potential is zero or positive, aggregation by hydrophobic association is not expected and the system is below critical micelle concentration, CMC. Indeed under such conditions materials should be mutually soluble.

There is described herein novel polymeric structures with properties making them eminently suitable for use in aqueous and non-aqueous compositions, while creating unique and useful properties and effects when so used. The polymers of this invention are characterized by having hydrophobic and complex hydrophobic groups interbonded to the water-soluble backbone. As a result, the polymer contains a mass of both a water-soluble polymer component, a complex hydrophobic component and optionally a hydrophobic component that act separately from each other bringing unique attributes to the total polymer.

The novel polymers of this invention provide a unique thickening capability in aqueous systems which is believed to stem from the unique, complex hydrophobic groups interbonded to the water-soluble backbone. These complex hydrophobic groups, which can be bunched, have the ability to readily form hydrophobic associations in water, with hydrophobic and complex hydrophobic groups from other molecules of the polymer. Because the hydrophobic associations interconnect a number of polymers, there is a build-up of interlocking water-soluble polymer backbones achieved through this hydrophobic association. Such interlocking of hydrophobic and complex hydrophobic groups in hydrophobic associations causes a dramatic increase in the apparent molecular weight of the polymer resulting in an increased viscosity of the aqueous medium.

Hydrophobic association applies to the polymers of this invention in aqueous systems and conceptually allows a great degree of freedom from the high degree of specificity in the definition of the particular polymer backbone, while at the same time explains why the utilization of complex hydrophobes provides unique rheology to dilute aqueous solutions of the polymers of this invention.

The implication of hydrophobic association is that the particular structure of the polymeric backbone which generates water-solubility is not critical to the performance of the polymer in the thickening operation other than providing hydrophilic quality to the molecule. What is critical is the placement of the complex hydrophobic groups in the polymer so as to enhance bridging of polymer chain to polymer chain thereby achieving enhanced thickening in aqueous systems.

Because the polymers of this invention are believed to operate by hydrophobic association, it is inconsequential to the practice of this invention as to the particular structure of the polymeric backbone involved so long as it provides the water-soluble characteristics to the total polymer and at the same time provides the substrate for the attachment of complex hydrophobic groups. For purposes of this invention, polymers having a polymeric backbone containing urethane units which are used for thickening aqueous, emulsion polymer, latex compositions are outside the scope of this invention.

The critical feature of the present invention is the provision in the water-soluble polymer of hydrophobic segments in which the polymer has at least one complex hydrophobic group. The hydrophobic segments can have one or more hydrophobes thereby forming a bunch of hydrophobes within that hydrophobic segment. In particular, the hydrophobic and complex hydrophobic groups within a hydrophobe segment can be in close association or proximity, preferably separated from each other by no more than about 50, most preferably less than about 25, covalently bonded, sequentially connected atoms, which can be sufficient to provide for enhanced thickening of aqueous solutions containing the polymer through the formation of intermolecular hydrophobic associations. A hydrophobic segment is defined as that portion of the water-soluble polymer having at least one hydrophobic and/or complex hydrohobic group. Such segments serve the unique function of providing for the nucleation of extraordinarily strong intermolecular hydrophobic associations when incorporated in an aqueous medium. The polymer may contain up to a substantial proportion of hydrophobic segments having bunched hydrophobic and complex hydrophobic groups. In another embodiment, essentially all the hydrophobic segments in the water-soluble polymer can have bunched hydrophobic and complex hydrophobic groups.

The number of hydrophobic and complex hydrophobic groups per hydrophobic segment required to provide optimum thickening efficiency can be decreased by either increasing the molar volume of the hydrophobe or complex hydrophobe or by reducing its contribution to the solubility parameter.

The polymer can preferably contain from about 2 to 25 hydrophobic segments, and most preferably from about 4 to about 11 segments per molecule. The number of hydrophobic segments is not critical so long as a sufficient number of hydrophobe segments is provided to enable the generation of intermolecular hydrophobic associations when the polymer is in aqueous solution.

It is to be understood that the benefits of this invention can be achieved in many cases by a relatively low concentration of polymer molecules which contain complex hydrophobic groups of this invention in mixtures with polymer molecules which do not contain such complex hydrophobic groups.

The composition of the hydrophobic compounds from which the hydrophobes are derived is not critical so long as the hydrophobes provide a molar volume contribution of greater than about 70 cubic centimeters per mole, and preferably greater than about 160 cubic centimeters per mole, and having a nominal contribution to the calculated solubility parameter of less than about 9.5 $(cal./cc)^{\frac{1}{2}}$, and preferably from about 6.5 to about 9.0 $(cal./cc)^{\frac{1}{2}}$. The molar volume and solubility contributions of various hydrophobes are readily estimated from their structure using methods well described in the literature, as in "New Values Of The Solubility Parameter From Vapor Pressure Data", by K. L. Hoy, Journal of Paint Technology, Volume 482, 116 (1970); "Solubility Parameters For Film Formers" by H. Burrell, Official Digest, 726 (1955); "Molar Volume Additivity Of Polymers", by R. Kawai, Chemistry of High Polymers, (Japan), Volume 13, Page 139 to 147 (1956); and Properties of Polymers, by D. W. Van Krevelan Elsevier/North-Holland, Inc., New York, N.Y., Chapter 7, 129 (1976).

TABLE 1

Calculated Molar Volumes and Solubility Parameters for Selected Hydrophobes

| Hydrophobe | Molar Volume, cc/mole | Solubility Parameter $(cal/cc)^{\frac{1}{2}}$ |
|---|---|---|
| n-pentyl | 83.7 | 8.06 |
| tolyl | 90.1 | 9.04 |
| ethylphenyls | 105.6 | 8.95 |
| n-propylphenyls | 121.2 | 8.89 |
| n-butylphenyls | 136.7 | 8.84 |
| n-phenylphenyls | 152.3 | 8.80 |
| isohexylphenyls | 161.8 | 8.63 |
| n-hexylphenyls | 167.8 | 8.77 |
| n-heptylphenyls | 183.4 | 8.74 |
| n-octylphenyls | 198.9 | 8.72 |
| isononylphenyls | 208.5 | 8.26 |
| n-nonylphenyls | 214.5 | 8.70 |
| n-decylphenyls | 230.0 | 8.68 |
| n-undecylphenyls | 245.6 | 8.67 |
| isododecylphenyls | 255.1 | 8.34 |
| n-dodecylphenyls | 261.1 | 8.66 |
| n-tetradecylphenyls | 292.2 | 8.63 |
| n-hexadecylphenyls | 338.9 | 8.62 |
| isooctadecylphenyls | 348.5 | 8.21 |

TABLE 2

Calculated Molar Volumes and Solubility Parameters for Selected Biphobes of the Form:

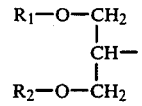

| $R_1$ | $R_2$ | Molar Volume, cc/mole | Solubility Parameter $(cal/cc)^{1/2}$ |
|---|---|---|---|
| n-nonylphenyl | methyl | 289.6 | 8.72 |
| n-nonylphenyl | ethyl | 305.1 | 8.78 |
| n-nonylphenyl | n-propyl | 320.7 | 8.70 |
| n-nonylphenyl | iso-propyl | 320.7 | 8.60 |
| n-nonylphenyl | n-butyl | 336.3 | 8.69 |
| n-nonylphenyl | iso-butyl | 336.3 | 8.60 |
| n-nonylphenyl | neo-butyl | 336.3 | 8.47 |

TABLE 2-continued

Calculated Molar Volumes and Solubility Parameters for Selected Biphobes of the Form:

$$R_1-O-CH_2$$
$$|$$
$$CH-$$
$$|$$
$$R_2-O-CH_2$$

| $R_1$ | $R_2$ | Molar Volume, cc/mole | Solubility Parameter $(cal/cc)^{1/2}$ |
|---|---|---|---|
| n-nonylphenyl | n-pentyl | 351.8 | 8.68 |
| n-nonylphenyl | iso-pentyl | 351.8 | 8.59 |
| n-nonylphenyl | neo-pentyl | 351.8 | 8.59 |
| n-nonylphenyl | n-hexyl | 367.4 | 8.67 |
| n-nonylphenyl | iso-hexyl | 367.4 | 8.58 |
| n-nonylphenyl | neo-hexyl | 367.4 | 8.58 |
| n-nonylphenyl | n-heptyl | 382.9 | 8.66 |
| n-nonylphenyl | iso-heptyl | 382.9 | 8.57 |
| n-nonylphenyl | neo-heptyl | 382.9 | 8.57 |
| n-nonylphenyl | n-octyl | 398.5 | 8.64 |
| n-nonylphenyl | iso-octyl | 398.5 | 8.56 |
| n-nonylphenyl | neo-octyl | 398.5 | 8.56 |
| n-nonylphenyl | n-nonyl | 414.0 | 8.62 |
| n-nonylphenyl | iso-nonyl | 414.0 | 8.55 |
| n-nonylphenyl | neo-nonyl | 414.0 | 8.55 |
| n-nonylphenyl | n-decyl | 429.6 | 8.60 |
| n-nonylphenyl | iso-decyl | 429.6 | 8.54 |
| n-nonylphenyl | neo-decyl | 429.6 | 8.54 |
| n-nonylphenyl | linear and branched alkyls | | |
| n-nonylphenyl | n-undecyl | 445.1 | 8.58 |
| n-nonylphenyl | iso-undecyl | 445.1 | 8.52 |
| n-nonylphenyl | neo-undecyl | 445.1 | 8.52 |
| n-nonylphenyl | n-dodecyl | 460.7 | 8.56 |
| n-nonylphenyl | iso-dodecyl | 460.7 | 8.50 |
| n-nonylphenyl | neo-dodecyl | 460.7 | 8.50 |
| n-nonylphenyl | n-tridecyl | 476.3 | 8.54 |
| n-nonylphenyl | iso-tridecyl | 476.3 | 8.48 |
| n-nonylphenyl | neo-tridecyl | 476.3 | 8.48 |
| n-nonylphenyl | n-tetradecyl | 491.8 | 8.51 |
| n-nonylphenyl | iso-tetradecyl | 491.8 | 8.46 |
| n-nonylphenyl | neo-tetradecyl | 491.8 | 8.46 |
| n-nonylphenyl | n-pentadecyl | 507.4 | 8.49 |
| n-nonylphenyl | iso-pentadecyl | 507.4 | 8.43 |
| n-nonylphenyl | neo-pentadecyl | 507.4 | 8.43 |
| n-nonylphenyl | n-hexadecyl | 522.9 | 8.45 |
| n-nonylphenyl | iso-hexadecyl | 522.9 | 8.41 |
| n-nonylphanyl | neo-hexadecyl | 522.9 | 8.41 |
| n-nonylphenyl | n-heptadecyl | 538.5 | 8.42 |
| n-nonylphenyl | iso-heptadecyl | 538.5 | 8.38 |
| n-nonylphenyl | neo-heptadecyl | 538.5 | 8.38 |
| n-nonylphenyl | n-octyldecyl | 554.0 | 8.38 |
| n-nonylphenyl | iso-octyldecyl | 554.0 | 8.34 |
| n-nonylphenyl | neo-octyldecyl | 554.0 | 8.34 |
| n-nonylphenyl | n-nonadecyl | 569.6 | 8.34 |
| n-nonylphenyl | iso-nonadecyl | 569.9 | 8.30 |
| n-nonylphenyl | neo-nonyldecyl | 569.6 | 8.30 |
| n-nonylphenyl | n-eicosyl | 585.1 | 8.30 |
| n-nonylphanyl | iso-eicosyl | 585.1 | 8.26 |
| n-nonylphenyl | neo-eicosyl | 585.1 | 8.26 |
| n-nonylphenyl | linear and branched alkylaryl | | |
| n-nonylphenyl | tolyl | 358.1 | 8.43 |
| n-nonylphenyl | ethylphenyl | 373.7 | 8.45 |
| n-nonylphenyl | cumyl | 389.2 | 8.47 |
| n-nonylphenyl | n-propylphenyl | 389.2 | 8.37 |
| n-nonylphenyl | n-butylphenyl | 404.8 | 8.48 |
| n-nonylphenyl | n-pentylphenyl | 420.3 | 8.48 |
| n-nonylphenyl | n-hexylphenyl | 435.9 | 8.48 |
| n-nonylphenyl | n-heptylphenyl | 451.4 | 8.48 |
| n-nonylphenyl | n-octylphenyl | 467.0 | 8.47 |
| n-nonylphenyl | n-nonylphenyl | 482.6 | 8.46 |
| n-nonylphenyl | n-decylphenyl | 498.1 | 8.44 |
| n-nonylphenyl | n-undecykphenyl | 513.7 | 8.43 |
| n-nonylphenyl | n-dodecylphenyl | 529.2 | 8.40 |
| n-nonylphenyl | n-tridecylphenyl | 544.8 | 8.38 |
| n-nonylphenyl | n-tetradecylphenyl | 560.3 | 8.35 |
| n-nonylphenyl | n-pentadecylphenyl | 575.9 | 8.31 |
| n-nonylphenyl | n-hexadecylphenyl | 591.4 | 8.28 |
| n-nonylphenyl | n-heptadecylphenyl | 606.9 | 8.23 |

TABLE 2-continued

Calculated Molar Volumes and Solubility
Parameters for Selected Biphobes of the Form:

$$R_1-O-CH_2$$
$$CH-$$
$$R_2-O-CH_2$$

| $R_1$ | $R_2$ | Molar Volume, cc/mole | Solubility Parameter $(cal/cc)^{1/2}$ |
|---|---|---|---|
| n-nonylphenyl | n-octadecylphenyl | 622.5 | 8.18 |
| n-nonylphenyl | n-nonadecylphenyl | 638.1 | 8.13 |
| n-nonylphenyl | n-eicosylphenyl | 653.6 | 8.06 |
| n-hexadecyl | methyl | 330.0 | 8.77 |
| n-hexadecyl | ethyl | 345.5 | 8.74 |
| n-hexadecyl | n-propyl | 361.1 | 8.72 |
| n-hexadecyl | n-butyl | 376.6 | 8.70 |
| n-hexadecyl | n-pentyl | 392.2 | 8.68 |
| n-hexadecyl | n-hexyl | 407.7 | 8.66 |
| n-hexadecyl | n-heptyl | 423.3 | 8.64 |
| n-hexadecyl | n-octyl | 438.8 | 8.62 |
| n-hexadecyl | n-nonyl | 454.4 | 8.60 |
| n-hexadecyl | n-decyl | 470.0 | 8.57 |
| n-hexadecyl | n-undecyl | 485.5 | 8.55 |
| n-hexadecyl | linear alkyl | | |
| n-hexadecyl | n-dodecyl | 501.0 | 8.52 |
| n-hexadecyl | n-tridecyl | 516.6 | 8.49 |
| n-hexadecyl | n-tetradecyl | 532.2 | 8.46 |
| n-hexadecyl | n-pentadecyl | 547.7 | 8.43 |
| n-hexadecyl | n-hexadecyl | 563.3 | 8.39 |
| n-hexadecyl | n-heptadecyl | 578.8 | 8.35 |
| n-hexadecyl | n-octadecyl | 594.4 | 8.30 |
| n-hexadecyl | n-nonadecyl | 609.9 | 8.25 |
| n-hexadecyl | n-eicosyl | 625.5 | 8.18 |

TABLE 3

Calculated Molar Volumes and Solubility
Parameters for Selected Biphobes of the Form:

$$CH_2-CH-CH_2-O-R-O-CH_2-CH-CH_2$$
$$O\qquad\qquad\qquad\qquad O$$
$$R_1\qquad\qquad\qquad\qquad R_2$$

| $R_1, R_2$ | R | Molar Volume, cc/mole | Solubility Parameter $(cal/cc)^{1/2}$ |
|---|---|---|---|
| methyl | n-butyl | 212.5 | 9.24 |
| ethyl | n-butyl | 243.6 | 9.12 |
| n-propyl | n-butyl | 274.7 | 9.03 |
| n-butyl | n-butyl | 305.8 | 8.94 |
| n-pentyl | n-butyl | 336.9 | 8.86 |
| n-hexyl | n-butyl | 368.0 | 8.79 |
| n-heptyl | n-butyl | 399.1 | 8.71 |
| n-octyl | n-butyl | 430.2 | 8.63 |
| n-nonyl | n-butyl | 461.3 | 8.54 |
| n-decyl | n-butyl | 492.4 | 8.43 |
| n-undecyl | n-butyl | 523.5 | 8.31 |
| n-dodecyl | n-butyl | 554.6 | 8.15 |
| n-tridecyl | n-butyl | 585.8 | 7.95 |
| n-tetradecyl | n-butyl | 616.9 | 7.68 |
| n-pentadecyl | n-butyl | 648.0 | 7.31 |
| n-hexadecyl | n-butyl | 679.1 | 6.77 |
| n-heptadecyl | n-butyl | 710.2 | 5.93 |
| n-octadecyl | n-butyl | 741.3 | 4.47 |
| tolyl | | 349.5 | 8.47 |
| ethylphenyl | n-butyl | 380.6 | 8.50 |
| n-propylphenyl | n-butyl | 411.7 | 8.51 |
| n-butylphenyl | n-butyl | 442.8 | 8.49 |
| n-pentylphenyl | n-butyl | 473.9 | 8.45 |
| n-hexylphenyl | n-butyl | 505.0 | 8.40 |
| n-heptylphenyl | n-butyl | 536.1 | 8.32 |
| n-octylphenyl | n-butyl | 567.2 | 8.22 |
| n-nonylphenyl | n-butyl | 598.4 | 8.10 |
| n-decylphenyl | n-butyl | 629.5 | 7.93 |

TABLE 3-continued

Calculated Molar Volumes and Solubility
Parameters for Selected Biphobes of the Form:

$$CH_2-CH-CH_2-O-R-O-CH_2-CH-CH_2$$
$$O\qquad\qquad\qquad\qquad O$$
$$R_1\qquad\qquad\qquad\qquad R_2$$

| $R_1, R_2$ | R | Molar Volume, cc/mole | Solubility Parameter $(cal/cc)^{1/2}$ |
|---|---|---|---|
| n-undecykphenyl | n-butyl | 660.6 | 7.72 |
| n-dodecylphenyl | n-butyl | 691.7 | 7.43 |
| n-tridecylphenyl | n-butyl | 722.8 | 7.04 |
| n-tetradecylphenyl | n-butyl | 753.9 | 6.48 |
| n-pentadecylphenyl | n-butyl | 785.0 | 5.64 |
| n-hexadecylphenyl | n-butyl | 816.1 | 4.20 |
| methyl | Bisphenol A | 334.0 | 8.12 |
| ethyl | Bisphenol A | 365.1 | 8.22 |
| n-propyl | Bisphenol A | 396.2 | 8.28 |
| n-butyl | Bisphenol A | 427.3 | 8.31 |
| n-pentyl | Bisphenol A | 458.4 | 8.31 |
| n-hexyl | Bisphenol A | 489.5 | 8.29 |
| n-heptyl | Bisphenol A | 520.6 | 8.24 |
| n-octyl | Bisphenol A | 551.7 | 8.18 |
| n-nonyl | Bisphenol A | 582.8 | 8.09 |
| n-decyl | Bisphenol A | 614.0 | 7.97 |
| n-undecyl | Bisphenol A | 645.0 | 7.81 |
| n-dodecyl | Bisphenol A | 676.1 | 7.60 |
| n-tridecyl | Bisphenol A | 707.2 | 7.32 |
| n-tetradecyl | Bisphenol A | 738.3 | 6.93 |
| n-pentadecyl | Bisphenol A | 768.4 | 6.38 |
| n-hexadecyl | Bisphenol A | 800.5 | 5.53 |
| n-heptadecyl | Bisphenol A | 831.6 | 4.08 |
| tolyl | Bisphenol A | 471.0 | 7.24 |
| ethylphenyl | Bisphenol A | 502.1 | 7.51 |
| n-propylphenyl | Bisphenol A | 533.2 | 7.68 |
| n-butylphenyl | Bisphenol A | 564.3 | 7.79 |
| n-pentylphenyl | Bisphenol A | 595.4 | 7.84 |
| n-hexylphenyl | Bisphenol A | 626.5 | 7.84 |
| n-heptylphenyl | Bisphenol A | 657.6 | 7.81 |
| n-octylphenyl | Bisphenol A | 688.7 | 7.74 |
| n-nonylphenyl | Bisphenol A | 719.8 | 7.62 |
| n-decylphenyl | Bisphenol A | 750.9 | 7.46 |
| n-undecykphenyl | Bisphenol A | 782.0 | 7.23 |
| n-dodecylphenyl | Bisphenol A | 813.1 | 6.91 |
| n-tridecylphenyl | Bisphenol A | 844.2 | 6.47 |
| n-tetradecylphenyl | Bisphenol A | 875.4 | 5.81 |
| n-pentadecylphenyl | Bisphenol A | 906.5 | 4.80 |
| n-hexadecylphenyl | Bisphenol A | 937.6 | 2.87 |

TABLE 4

Calculated Molar Volumes and Solubility,
Parameters for Selected Multiphobes of the Form:

$$R_1-O-CH_2$$
$$CH-[(OCH_2CH_2)_4-OCH_2-CH-$$
$$R_2-O-CH_2 \qquad\qquad CH_2$$
$$\qquad\qquad\qquad O$$
$$\qquad\qquad\qquad R']_k$$

| $R_1, R_2, R'$ | k | Name | Molar Volume, cc/mole | Solubility Parameter $(cal/cc)^{1/2}$ |
|---|---|---|---|---|
| n-nonylphenyl | 0 | BiPhobe | 482.6 | 8.46 |
| n-nonylphenyl | 1 | TriPhobe | 900.9 | 3.81 |
| n-nonylphenyl | 2 | QuadPhobe | 1319 | <3.81 |
| n-nonylphenyl | 3 | QuintPhobe | 1737 | — |
| n-nonylphenyl | 4 | HexPhobe | 2156 | — |
| n-nonylphenyl | 5 | HeptPhobe | 2574 | — |
| n-nonylphenyl | 6 | OctPhobe | 2993 | — |

Molar volume contributions of less than about 70 cubic centimeters per mole are generally undesirable in aqueous applications since dynamic dimer, trimer and tetramer water molecular aggregations (formed by hydrogen bonding of the water molecules) are generally prevalent in such solutions. As such, hydrophobes providing a molar volume contribution of less than about 70 cubic centimeters per mole would not provide a significant difference between the molar volume of the aggregated water molecules and such smaller hydrophobes.

The foregoing and numerous other useful monohydroxyl and amino compounds are well known as described in standard organic textbooks and other reference works.

The complex hydrophobic groups, i.e., complex hydrophobes, useful in this invention can be derived from compounds having at least one active hydrogen represented by the formula:

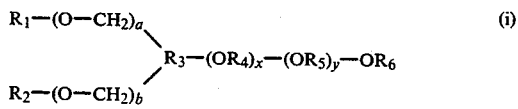   (i)

wherein $R_1$ and $R_2$ are the same or different and are hydrogen or a substituted or unsubstituted monovalent hydrocarbon residue, $R_3$ is a substituted or unsubstituted divalent or trivalent hydrocarbon residue, each $R_4$ is the same or different and is a substituted or unsubstituted divalent hydrocarbon residue, each $R_5$ is the same or different and is a substituted or unsubstituted divalent hydrocarbon residue, $R_6$ is hydrogen, a substituted or unsubstituted monovalent hydrocarbon residue or an ionic substituent, a and b are the same or different and are a value of 0 or 1, and x and y are the same or different and are a value of 0 or greater; provided at least two of $R_1$, $R_2$, $R_3$, $R_4$, $R_5$ and $R_6$ are a hydrocarbon residue having greater than 2 carbon atoms in the case of $R_1$, $R_2$ and $R_6$ or having greater than 2 pendant carbon atoms in the case of $R_3$, $R_4$ and $R_5$. The polymers of this invention are other than a terpolymer of styrene, maleic anhydride and a macromonomer derived from maleic anhydride and a compound of formula (i) in which $R_1$ is hexadecyl, a is a value of 1, $R_2$ is tetradecyl, b is a value of 0, $R_3$ is

, $R_4$ is —$CH_2CH$(tetradecyl)-, x is a value of 1, $R_5$ is —$CH_2CH_2$—, y is a value of 34 and $R_6$ is hydrogen.

Other complex hydrophobic groups, i.e., complex hydrophobes, useful in this invention can be derived from compounds having at least one active hydrogen represented by the formula:

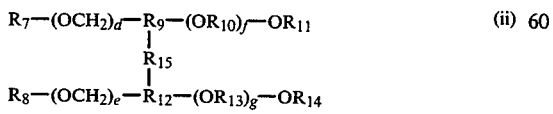   (ii)

wherein $R_7$ and $R_8$ are the same or different and are hydrogen or a substituted or unsubstituted monovalent hydrocarbon residue, $R_{11}$ and $R_{14}$ are the same or different and are hydrogen, a substituted or unsubstituted monovalent hydrocarbon residue or an ionic substituent, $R_9$ and $R_{12}$ are the same or different and are a substituted or unsubstituted divalent or trivalent hydrocarbon residue, each $R_{10}$ is the same or different and is a substituted or unsubstituted divalent hydrocarbon residue, each $R_{13}$ is the same or different and is a substituted or unsubstituted divalent hydrocarbon residue, $R_{15}$ is a substituted or unsubstituted divalent hydrocarbon residue, d and e are the same or different and are a value of 0 or 1, and f and g are the same or different and are a value of 0 or greater; provided at least two of $R_7$, $R_8$, $R_9$, $R_{10}$, $R_{11}$, $R_{12}$, $R_{13}$, $R_{14}$ and $R_{15}$ are a hydrocarbon residue having greater than 2 carbon atoms in the case of $R_7$, $R_8$, $R_{11}$ and $R_{14}$ or having greater than 2 pendant carbon atoms in the case of $R_9$, $R_{10}$, $R_{12}$, $R_{13}$ and $R_{15}$.

Illustrative substituted and unsubstituted monovalent hydrocarbon residues contain from 1 to about 50 carbon atoms or greater and are selected from alkyl radicals including linear or branched primary, secondary or tertiary alkyl radicals, such as methyl, ethyl, n-propyl, isopropyl, amyl, sec-amyl, t-amyl, 2-ethylhexyl and the like; aryl radicals such as phenyl, naphthyl and the like; arylalkyl radicals such as benzyl, phenylethyl, triphenylmethylethane and the like; alkylaryl radicals such as octylphenyl, nonylphenyl, dodecylphenyl, tolyl, xylyl and the like; and cycloalkyl radicals such as cyclopentyl, cyclohexyl, cyclohexylethyl and the like. The permissible hydrocarbon residues may contain fluorine, silicon, or other non-carbon atoms.

Preferably, the substituted and unsubstituted hydrocarbon residues are selected from alkyl and aryl radicals which contain from about 1 to 30 carbon atoms or greater. More preferably, the alkyl radicals contain from 1 to 18 carbon atoms, while the aryl, arylalkyl, alkylaryl and cycloalkyl radicals preferably contain from 6 to 18 carbon atoms or greater.

In a preferred embodiment of this invention, $R_1$, $R_2$, $R_7$ and $R_8$ can individually be a hydrocarbon radical represented by the formula:

   (iii)

wherein $R_{16}$ and $R_{17}$ are as defined for $R_1$, $R_2$, $R_7$ and $R_8$ above, h and i are the same or different and are a value of 0 or 1, and $R_{18}$ is as defined for $R_3$ above. For compounds represented by formulae (i) and (ii), it is understood that each formula (iii) radical in a given compound may be the same or different and the $R_{16}$ and/or $R_{17}$ groups may themselves be a formula (iii) radical to provide complex hydrophobes of a dendritic or of a cascading nature as described below. Further, $R_4$, $R_5$, $R_{10}$ and $R_{13}$ can individually be a hydrocarbon radical represented by the formula:

   (iv)

wherein $R_{19}$ is as defined for $R_4$, $R_5$, $R_{10}$ and $R_{13}$ above, $R_{20}$ is as defined for $R_6$, $R_{11}$ and $R_{14}$ above, and j is a value of 0 or greater.

Illustrative ionic substituents for $R_6$, $R_{11}$, $R_{14}$ and $R_{20}$ include cationic and anionic substituents such as sulfates, sulfonates, phosphates and the like. $R_6$, $R_{11}$, $R_{14}$ and $R_{20}$ may preferably be an organic residue containing 1 or more hydroxyls or nitrogen derivatives or epoxides or other reactive groups which may or may not contain unsaturation.

Other illustrative terminal groups which are described by $R_6$, $R_{11}$, $R_{14}$ and and $R_{20}$ include, for example, hydrocarbon residues which may contain allylic or vinylic unsaturation, acrylic or methacrylic functionality, styryl or alpha-methylstyryl functionality, and the like, such as the reaction product between the terminal alcohol ($R_6$, $R_{11}$, $R_{14}$ and $R_{20} =H$) and glycidyl methacrylate, isocyanatoethyl methacrylate, alpha, alpha-dimethyl-m-isopropenyl benzyl isocyanate (m-TMI), and the like. Other examples of terminal groups may include hydrocarbon residues of alkyl, aryl, aralkyl, alkaryl, and cycloalkyl radicals which may or may not be substituted with one or more of the following: hydroxyl, carboxyl, isocyanato, amino, mono- or disubstituted amino, quaternary ammonium, sulfate, sulfonate, phosphate, epoxy, and the like and may or may not contain other non-carbon atoms including silicon or fluorine. Also included can be divalent siloxy radicals. Other nonhydrocarbon terminal groups may include sulfates, phosphates, and the like.

Illustrative divalent hydrocarbon residues represented by $R_3$, $R_4$, $R_5$, $R_9$, $R_{10}$, $R_{12}$, $R_{13}$, $R_{15}$, $R_{18}$ and $R_{19}$ in the above formulae include substituted and unsubstituted radicals selected from alkylene, -alkylene-oxy-alkylene-, -arylene-oxy-arylene-, arylene, alicyclic radicals, phenylene, naphthylene, -phenylene-$(CH_2)_m(Q)_n(CH_2)_m$-phenylene- and -naphthylene-$(CH_2)_m(Q)_n(CH_2)_m$-naphthylene- radicals, wherein Q individually represents a substituted or unsubstituted divalent bridging group selected from $-CR_{21}R_{22}-$, $-O-$, $-S-$, $-NR_{23}-$, $-SiR_{24}R_{25}-$ and $-CO-$, wherein $R_{21}$ and $R_{22}$ individually represent a radical selected from hydrogen, alkyl of 1 to 12 carbon atoms, phenyl, tolyl and anisyl; $R_{23}$, $R_{24}$ and $R_{25}$ individually represent a radical selected from hydrogen and methyl, and each m and n individually have a value of 0 or 1. More specific illustrative divalent radicals represented by $R_3$, $R_4$, $R_5$, $R_9$, $R_{10}$, $R_{12}$, $R_{13}$, $R_{15}$, $R_{18}$ and $R_{19}$ include, e.g., 1,1-methylene, 1,2-ethylene, 1,3-propylene, 1,6-hexylene, 1,8-octylene, 1,12-dodecylene, 1,4-phenylene, 1,8-napthylene, 1,1'-biphenyl-2,2'-diyl, 1,1'-binaphthyl-2,2'-diyl, 2,2'-binaphthyl-1,1'-diyl and the like. The alkylene radicals may contain from 2 to 12 carbon atoms or greater, while the arylene radicals may contain from 6 to 18 carbon atoms or greater. Preferably, $R_3$, $R_4$, $R_5$, $R_9$, $R_{10}$, $R_{12}$, $R_{13}$, $R_{15}$, $R_{18}$ and $R_{19}$ are an alkylene or arylene radical. The permissible divalent hydrocarbon residues may contain fluorine, silicon, or other non-carbon atoms.

Illustrative trivalent hydrocarbon residues represented by $R_3$, $R_9$, $R_{12}$ and $R_{18}$ in the above formulae include substituted and unsubstituted radicals selected from

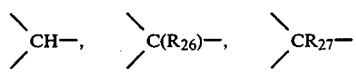

and the like, wherein $R_{26}$ is a substituted or unsubstituted monovalent hydrocarbon residue as described herein and $R_{27}$ is a substituted or unsubstituted divalent hydrocarbon residue as described herein.

Of course, it is to be further understood that the hydrocarbon residues in the above formulae may also be substituted with any permissible substituent. Illustrative substituents include radicals containing from 1 to 18 carbon atoms such as alkyl, aryl, aralkyl, alkaryl and cycloalkyl radicals; alkoxy radicals; silyl radicals such as $-Si(R_{28})_3$ and $-Si(OR_{28})_3$, amino radicals such as $-N(R_{28})_2$; acyl radicals such as $-C(O)R_{28}$; acyloxy radicals such as $-OC(O)R_{28}$; carbonyloxy radicals such as $-COOR_{28}$; amido radicals such as $-C(O)N(R_{28})_2$ and $-N(R_{28})COR_{28}$; sulfonyl radicals such as $-SO_2R_{28}$; sulfinyl radicals such as $-SO(R_{28})_2$; thionyl radicals such as $-SR_{28}$; phosphonyl radicals such as $-P(O)(R_{28})_2$; as well as halogen, nitro, cyano, trifluoromethyl and hydroxy radicals and the like, wherein each $R_{28}$ can be a monovalent hydrocarbon radical such as alkyl, aryl, alkaryl, aralkyl and cycloalkyl radicals, with the provisos that in amino substituents such as $-N(R_{28})_2$, each $R_{28}$ taken together can also compromise a divalent bridging group that forms a heterocyclic radical with the nitrogen atom, in amido substituents such as $-C(O)N(R_{28})_2$ and $-N(R_{28})COR_{28}$, each $R_{28}$ bonded to N can also be hydrogen, and in phosphonyl substituents such as $-P(O)(R_{28})_2$, one $R_{28}$ can by hydrogen. It is to be understood that each $R_{28}$ group in a particular substituent may be the same or different. Such hydrocarbon substituent radicals could possibly in turn be substituted with a permissible substituent such as already herein outlined above.

Preferred alkylene oxides which can provide random or block oxyalkylene units in the complex hydrophobe compounds represented by formulae (i) and (ii) include alkylene oxides such as ethylene oxide, propylene oxide, 1,2-butylene oxide, 2,3-butylene oxide, 1,2- and 2,3-pentylene oxide, cyclohexylene oxide, 1,2-hexylene oxide, 1,2-octylene oxide, 1,2-decylene oxide, and higher alpha-olefin epoxides; epoxidized fatty alcohols such as epoxidized soybean fatty alcohols and epoxidized linseed fatty alcohols; aromatic epoxides such as styrene oxide and 2-methylstyrene oxide; and hydroxy- and halogen-substituted alkylene oxides such as glycidol, epichlorohydrin and epibromohydrin. The preferred alkylene oxides are ethylene oxide and propylene oxide. Also included can be hydrocarbon residues from substituted and unsubstituted cyclic esters or ethers such as oxetane and tetrahydrofuran. It is understood that the compounds represented by formulae (i) and (ii) herein can contain random and/or block oxyalkylene units as well as mixtures of oxyalkylene units. It is further understood that each $R_4$, $R_5$, $R_{10}$, $R_{13}$ and $R_{19}$ group in a particular substituent for all positive values of x, y, f, g and j respectively can be the same or different.

The values of x, y, f, g and j are not narrowly critical and can vary over a wide range. For example, the values of x, y, f, g and j can range from 0 to about 200 or greater, preferably from about 0 to about 100 or greater, and more preferably from about 0 to about 50 or greater. Any desired amount of alkylene oxide can be employed, for example, from 0 to about 90 weight percent or greater based on the weight of the complex hydrophobe compound.

Referring to the general formulae (i) and (ii) above, it is appreciated that when $R_1$, $R_2$, $R_7$ and/or $R_8$ are a hydrocarbon residue of formulae (iii) above, the resulting compound may include any permissible number and combination of hydrophobic groups of the dendritic or cascading type. Such compounds included in the above general formulae should be easily ascertainable by one skilled in the art. Illustrative complex hydrophobes useful in this invention and processes for preparation thereof are disclosed in copending U.S. Pat. application Ser. No. 887,648, incorporated herein by reference.

In a preferred embodiment of this invention, the structure shown in formula (iii) can be a residue of the reaction product between epichlorohydrin and an alcohol, including those alcohols whose residues can be described by formula (iii), or a phenolic, or a mixture thereof. The structures which result can be described as complex hydrophobes of a dendritic or of a cascading nature. Pictorially, they can be described as shown below:

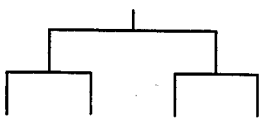

Other complex hydrophobic groups, i.e., complex hydrophobes, useful in this invention can be derived from macromonomer compounds disclosed in copending U.S. Pat. application Ser. No. 887,645 and copending U.S. Pat. application Ser. No. 887,646, both of which are incorporated herein by reference.

The polymers of this invention may be structurally defined to include those compounds having the formula:

$$A[B(C)_{y'}]_{x'} \quad (II)$$

wherein A is a water-soluble polymer segment; B is a connecting segment comprising a covalent bond or a polyvalent organic radical; C is a hydrophobic or complex hydrophobic group; the number of hydrophobe and complex hydrophobe segments, $x'$, defined by $B(C)_{y'}$, is greater than 0; the number of hydrophobes and complex hydrophobes, C, for each hydrophobic segment, defined as $y'$, is greater than or equal to 1, $y'$ can have values of greater than 1, i.e., $$\overline{y'} = \frac{\sum_{n=1}^{x'} y'x'}{x'} \geq 1, \quad (III)$$

such that the polymer can have an amount of bunching comprising at least two hydrophobic groups per hydrophobic segment. The polymer has an amount of complex hydrophobic groups sufficient to provide for enhanced thickening of aqueous solutions containing the polymer. The $y'$ value in Equation II sets forth the number of hydrophobic or complex hydrophobic groups per hydrophobic segment. The $x'$ value sets forth the average number of hydrophobic segments per molecule. Equation III sets forth the amount of bunching in that the average number of hydrophobic and complex hydrophobic groups per hydrophobic segment, $y'$, can be greater than 1. The average number of hydrophobic and complex hydrophobic groups per hydrophobic segment, $y'$, is defined as a total number of hydrophobic and complex hydrophobic groups (i.e., the summation of all hydrophobic and complex hydrophobic groups per hydrophobic segment, $y'x'$), divided by the total number of hydrophobic segments, $x'$.

The connecting segment, B, may be water-soluble or water-insoluble. The hydrophobic segments, $B(C)_{y'}$, may be attached in a pendant fashion to $x'$ terminal and/or interior bonds of the water-soluble polymer backbone A; or the connecting segment, B, may be incorporated as part of the polymer backbone between a plurality of water-soluble polymer segments.

The polymers of this invention may have utility in both aqueous and non-aqueous systems. They may be utilized to treat inorganic particulate materials used as fillers and pigments to alter their surface characteristics, thereby enhancing particle wetting when incorporated in a resin system. For example, fillers like silica, zinc oxide, wollastonite, calcium carbonate, glass fibers, clays, molecular sieves, and the like can be suspended more effectively into resin compositions containing a relatively small amount of the polymers of this invention. The polymers of this invention can also be used to treat the surface of these particulate materials before they are supplied or incorporated in a resin composition. If the particulate material which is supplied to the resin has a water-rich layer on its surface, or is hydrated, then it is expected that the water-soluble portion of the polymer of this invention will to some extent dissolve in that layer and thereby provide at least a monolayer of the polymer structure about the particulate material. Consequently, the hydrophobic and complex hydrophobic groups of the polymer will extend away from the water-rich portion of the surface of the particles and will be incorporated into the resin continuous phase (matrix) of the resin composition to which these particulate materials are added. The advantage in that particular instance is that by wetting the surface with a material which is compatible with that surface, and by providing it with hydrophobic and complex hydrophobic groups which are readily compatible with the resin to which the particulate material is being incorporated, one is better able to wet the particulate material with the resin to which it is being added, thereby suspending the particulate material in the resin more effectively.

When used in an aqueous solution, the water-soluble organic polymers of this invention are provided in an effective amount to produce thickening of the aqueous solution. An "effective thickening amount" is defined as the quantity of polymer, whether alone or in combination with polymer thickeners of the prior art, required to produce enhanced thickening. Such amount will usually range between about 0.05 to about 10 weight percent, preferably between about 0.1 to about 5 weight percent, and most preferably between about 0.2 to about 2 weight percent of the total composition. Such thickened compositions are useful in a wide variety of applications, such as latex compositions.

The polymers of this invention are derived from reactions involving water-soluble monomeric or polymeric reactants and hydrophobic and complex hydrophobic reactants, i.e., compounds containing hydrophobic and/or complex hydrophobic groups. Optionally, a connecting monomer may also be provided as a linking compound between the water-soluble reactant and the hydrophobic or complex hydrophobic reactant.

The polymers of the present invention may be made by:

(A) bonding the requisite hydrophobes and complex hydrophobes to a water-soluble polymer reactant containing functional groups available for linking the hydrophobes and complex hydrophobes to the polymer without extending the chain length of the water-soluble portions of the polymer;

(B) reacting condensation monomers and/or prepolymers to form condensation polymers wherein at least one of which contains the requisite complex hydrophobe component; or (C) reacting olefinically unsaturated monomers and/or prepolymers by addition polymerization, wherein at least one of which contains the requisite complex hydrophobe component.

The polymer designated (A) above can be any water-soluble, naturally occurring polymer, any water-soluble, modified naturally occurring polymer, or any water-soluble, synthetically produced polymer, such as derived from the prepolymers hereinafter described for (B) and (C).

Illustrative of such naturally occurring polymers are: gelatin, natural gums, casein, starch, alginates, and the like. Modified naturally occurring polymers are the modified cellulosic polymers wherein the modification causes the cellulosic polymer to be water-soluble. Illustrative of such polymers are starch derivatives; the hydroxyethyl cellulosics formed by reacting ethylene oxide with cellulose to a degree sufficient to form a polymer soluble in some proportion in water; water-soluble carboxymethyl cellulose; quarternerized ammonium substituted cellulosics such described in U.S. Pat. No. 3,472,840, and other such cellulosic derivations. The other naturally occurring polymers may all be oxyethylated by reaction with ethylene oxide, or reacted with other reactants which provide functionality and do not appreciably hinder the intrinsic solubility of the polymers in water.

With respect to the condensation polymers designated (B) above, illustrative examples include condensation polyamides and polyesters, polyethers, and the like. In this latter regard, the term condensation polymer is defined to encompass not only those polymers formed from monomer molecules which combine with the loss of simple molecules, such as water, but also to include polymers formed by chemical reactions in which the rearrangement of the functional moieties of the monomer molecules during polymerization avoids a loss of a simple molecule.

These polymers are achieved by known condensation reactions by reacting polyfunctional reactants which possess sufficient complementary functional groups to allow condensation and polymerization. Examples of such functional groups which are considered complementary for effecting condensation and polymerization are the following:

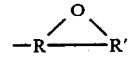

| Functional Group | Complementary Functional Group |
|---|---|
| —NH₂ | —COOH |
| | —COX* |
| | (*X is halogen) |
| —OH | |
| —SH | O<br>/  \<br>—CH——CH₂ |
| | —C—Cl (Williamson synthesis) |
| | —COOR* |
| | (*OR is an ester forming group) |
| | O<br>‖<br>—CH₂=CH—C— |
| | (Michael Addition) |
| | —CHO |
| | (aldehyde) |
| | —CRO |
| | (ketone) |

| Functional Group | Complementary Functional Group |
|---|---|
| | —CH₂OH |
| | (methylol) |
| | —CONH₂ |
| | O<br>/  \<br>—R——R' |
| | (cyclic ethers) |

Obviously, functional group combinations other than those cited above can be appropriately used in the practice of this invention.

The polymers designated (C) above are the product of the reaction of monomeric or prepolymer components interreacting by addition polymerization through olefinically unsaturated double bonds. With respect to the addition polymers, illustrative examples include polyacrylics; such as polyacrylates, polymethacrylates, polyhydroxyethylacrylates and polyacrylamides; polyvinyl compounds; and the like.

The present invention relates to a process for producing a water-soluble organic polymer which comprises:

(a) Bonding (1) a functional group-containing hydrophobic reactant that has at least one complex hydrophobic group and that can have a hydrophobe bunch of at least two hydrophobic groups, complex hydrophobic groups or mixtures with (2) a water-soluble polymer reactant containing a complementary functional group whereby said hydrophobic reactant is covalently bonded to the polymer; or (b) Interreacting (1) a functional group-containing hydrophobic reactant that has at least one complex hydrophobic group and that can have a hydrophobe bunch of at least two hydrophobic groups, complex hydrophobic groups or mixtures with (2) a complementary functional water-soluble prepolymer or monomer whereby the two are copolymerized to provide a water-soluble polymer containing said hydrophobic reactant; or (c) Interreacting (1) a functional group-containing hydrophobic reactant that has at least one complex hydrophobic and optionally hydrophobic group with (2) A complementary functional water-soluble prepolymer whereby the two are copolymerized to provide a water-soluble polymer having at least one complex hydrophobic group and at least one hydrophobe bunch containing at least two hydrophobic groups, complex hydrophobic groups or mixtures.

In the broadest sense, the water-soluble organic polymers of this invention may be prepared using either of two basic procedures. In a first embodiment for making condensation polymers (B) or addition polymers (C) as described above, the hydrophobic and complex hydrophobic reactants and water-soluble polymeric or monomeric reactants, and optionally connecting monomers, are reacted either prior to or during the polymerization to form the polymer of this invention having complex hydrophobic groups. In a second embodiment for making any of the polymers (A), (B), or (C) above, the water-soluble polymer reactant is a relatively high-molecular weight polymer, having a weight average molecular weight of about 10,000 or greater. In this embodiment, the water-soluble polymer reactant has a plurality of functional side and/or terminal groups which are reactive with functional groups of hydrophobic and complex hydrophobic compounds which allow bonding onto the water-soluble organic polymer to provide an amount of hydrophobic and complex hydrophobic groups sufficient to provide for enhanced thickening of aqueous solutions containing the polymer.

In the first embodiment, a variety of polymerization processes can be utilized in order to produce polymers having hydrophobic and complex hydrophobic groups and optionally bunched hydrophobe segments. One such process which is quite effective, is to perform a compound having a bunch of hydrophobic and complex hydrophobic groups prior to polymerization. In this way, the incorporation of bunched hydrophobe segments is insured. Using such a process, the preforming of the hydrophobe and complex hydrophobe reactant can be achieved by reacting hydrophobic and complex hydrophobic reactants together or with a connecting monomer to produce a hydrophobic or complex hydrophobic reactant having bunched hydrophobe segments. These hydrophobic and complex hydrophobic reactants can then be polymerized with a water-soluble polymeric or monomeric reactant to provide a water-soluble organic polymer.

A second polymerization process relies upon the kinetics of the polymerization reaction to provide formation of bunched hydrophobe segments. By providing a difunctional, connecting monomer having functional moieties which selectively polymerize with the functional moieties of the hydrophobic and complex hydrophobic reactant, even in the presence of the water-soluble polymer reactant (having functional moieties less reactive with the connecting monomer), bunched hydrophobe segments can be formed initially, followed by extension of the polymer with the water-soluble polymer reactant.

A third polymerization process involves making a prepolymer of the water-soluble polymer segment and joining such prepolymers with an equivalent or larger molar amount of hydrophobic and complex hydrophobic compounds having single hydrophobic groups. Using such a process, the formation of bunched hydrophobe segments is insured on the basis of statistical considerations. As the molar ratio of hydrophobic and complex hydrophobic reactants to prepolymer is increased, the number of hydrophobes per bunch is correspondingly increased.

Conceivably, variations of these procedures for achieving hydrophobe bunch formation, although much less effective, may be to (1) graft a large molar amount of hydrophobic or complex hydrophobic reactant having a single hydrophobe in a random fashion to a preformed, water-soluble backbone or alternatively (2) copolymerize an excessive molar amount of hydrophobic or complex hydrophobic reactant having a single hydrophobe with low-molecular weight water-soluble monomers. If enough hydrophobic and complex hydrophobic reactant is added, bunching might result. A drawback to these procedures is that the amount of hydrophobic and complex hydrophobic reactants required to achieve a substantial degree of bunching may limit the water-solubility of the polymer and its ability to form intermolecular hydrophobic associations.

The polymers of this invention contain hydrophobes and complex hydrophobes derived from hydrophobic reactants which may be reacted directly, or through a connecting monomer, with the water-soluble polymer reactants or may be bonded onto a water-soluble backbone or a side group attached to the backbone. The hydrophobic and complex hydrophobic reactants contain at least one hydrophobic group, or in a preferred embodiment, comprise a plurality of hydrophobic groups. The hydrophobe and complex hydrophobe compounds may be monofunctional or difunctional depending upon the reactive process required to chemically bond the hydrophobic reactants to the water-soluble reactant or to the connecting monomer.

Some of the specific examples of preferred hydrophobic and complex hydrophobic reactants which can be used to form bunches of hydrophobes that can be incorporated into the polymer either pendantly or integrally under the appropriate reaction conditions or sequence of reactions are complex alkylaryl reactants. Most preferred hydrophobic reactants include complex alkylaryls having at least about 8 carbon atoms. Preferred complex hydrophic compounds include complex polyalkylaryls. Particularly preferred hydrophobic compounds include bis-nonylphenol, bis-octylphenol and the reaction product of nonylphenol and nonylphenol glycidyl ether.

The amount of hydrophobic compound which can be added to produce the hydrophobes and complex hydrophobes on the water-soluble polymers may range from about 0.01 to about 10 weight %, more preferably about 0.1 to about 5 weight %, and most preferably from about 0.5 to about 2.5 weight % of the total polymer product.

With respect to the polymer reactants designated (A), the complex hydrophobic compounds may be coupled to such polymer reactants through a functional group along the polymer. The functional groups of the water-soluble polymer reactants contain moieties which provide the reactivity required to chemically bond the water-soluble polymer reactant to the hydrophobic reactants. Such moieties can be either active hydrogen, e.g. hydroxyl, sulfhydryl, amino and the like or the corresponding complementary functionality of carboxylate, anhydride, epoxide, and the like. In the case where the reactants of the water-soluble polymer reactants and the hydrophobe and complex hydrophobe reactant are identical, a connecting monomer of the corresponding complementary type may be used to bind the hydrophobe and complex hydrophobe to the water-soluble polymer.

Other examples of such functional groups include, but at not limited to: hydroxyls; sulfhydryls, aminos, ethylenic unsaturations, epoxides, carboxylic acids, carboxylic esters, carboxylic acid halides, amides, phosphates, sulfonates, sulfonyl halides, organic silanes, acetylenes, phenols, cyclic carbonates, and carbodiimides. The coupling of such hydrophobic compounds to the polymer through such active hydrogens can be achieved by reactions in which such active hydrogens participate, such as the functional condensation groups depicted above.

For example, hydroxyethylcellulose, polyvinyl alcohol or polyacrylamides, can have bunched hydrophobe substitution introduced therein by reacting functional hydroxyethyl, hydroxyl or amino groups, respectively on these polymer with a complementary functional complex hydrophobic compound. Obviously, many other kinds of complementary functional compounds containing bunched hydrophobes within the contemplation of this invention will be apparent to those skilled in the art.

With respect to the polymer reactants designated (B), the hydrophobe or complex hydrophobe containing reactant is typically polyfunctional, preferably difunctional, so as to assure the formation of a polymer. Many kinds of complementary difunctional compounds containing complex hydrohobes and optionally bunched hydrophobes within the contemplation of this invention will be apparent to those skilled in the art.

In a preferred embodiment, a connecting monomer is also provided as a linking compound between the water-soluble polymer reactant and a hydrophobe or complex hydrophobe reactant. The connecting monomer is preferably difunctional, having at least two terminal functional groups which provide the reactivity required to chemically bond to the hydrophobic reactants to the water-soluble polymer reactant.

The amount of connecting monomers which can be reacted to a water-soluble reactant or hydrophobic reactants may range from about 0.1 to about 10 weight %, more preferably from about 0.5 to about 7 weight %, most preferably 1.5 to about 4 weight % of the total polymer product.

The complex hydrophobic reactant's functionality will be complementary to those of other reactants, as set forth above, to produce the desired water-soluble polymer. In making such polymers water-soluble, the complementary reactants should contain polar groups which are not functional groups participating in the condensation reaction to provide sufficient water-solubility in the polymer. When the polymer is formed, the polymer will either possess the desired water-solubility or can be rendered water-soluble by ionization or by grafting polar groups such as methylol or hydroxyethyl groups to active hydrogen containing moieties existing along the polymer chain. In the preferred case, at least one of the complementary reactants, i.e., the water-soluble polymer reactant, used to form the polymer contains sufficient repeating oxyethylene groups or aminoethyl groups to render the resulting polymer water-soluble, even though the polymer contains the bunched hydrophobe content of this invention.

An illustrative portion of the condensation polymer designated (B) is:

$$[-X-Y-Z-] \qquad (VI)$$

wherein (1) X is a divalent radical derived from a water-soluble polymer reactant having the following structure: $e-R^2-e$, in which e is one of the functional groups listed above and $R^2$ is a divalent hydrocarbon radical such as:

$$-(CH_2CH_2O)_{x''}-CH_2CH_2-,$$

$$\underset{\underset{H}{|}}{(CH_2CH_2N)_{x''}}-CH_2CH_2-,$$

$$\underset{\underset{CH_3}{|}}{(CH_2CH_2O)_{y''}}-(CH_2CH_2O)_{x''}-CH_2CH_2-,$$

$$\underset{\underset{CONH_2}{|}}{-(CH_2CH)_{x''}}-CH_2CH_2-$$

in which x″ is an integer large enough to cause the resulting polymer to possess water-solubility and y″ is an integer less than x″;

(2) Y is a divalent radical derived from a connecting monomer having the following structure: $f-R^3-f$, in which f is one of the functional groups listed above as being complementary functional, and $R^3$ is any divalent hydrocarbon radical which with the composition of $R^2$ and Z provides for the desired water-solubility; and (3) Z is a divalent hydrocarbon radical derived from a hydrophobic or complex hydrophobic reactant having the following choice of structures: $e-R_4-e$ and/or $f-R_4-f$, in which $R^4$ contains at least one hydrophobe or complex hydrophobe containing moiety; e and f are as defined above, and the selection of each is predicted upon the stoichiometric ratio of e to f in order to achieve the desired molecular weight of the polymer and to insure the incorporation of bunched hydrophobes of Z into the polymeric structure. When $R^4$ contains only one hydrophobic or complex hydrophobic group, the selective reactivity between Y and Z and the size of Y can be sufficient to provide for bunching of hydrophobes in Z. In other words Y can be sufficiently small and can separate at least two hydrophobic or complex hydrophobic groups in the Z radicals to provide the hydrophobic and complex hydrophobic groups in sufficient proximity of close association to produce hydrophobic associations resulting in enhanced thickening of aqueous solutions containing such polymers.

With respect to the polymers designated (C), polymeric formation follows the rules of polymers (B) above, i.e., the reactants are selected to yield a polymer which is water-soluble and which contains the requisite complex hydrophobes and optionally bunched hydrophobes. The polymerization of the olefininically unsaturated monomers which make up polymer (C) may be achieved by any of the known addition polymerizations such as free-radical, anionic, cationic, or metal coordination methods. The polymerization may be effected interfacially, in solution, emulsion, suspension, and the like. In the typical case of polymerization will utilize at least two (2) copolymerizable components, one of which provides the water-solubility to the polymer (either as a result of copolymerization or as a result of treatment after copolymerization), and the other of which provides the desired bunched hydrophobe content in the polymer.

Illustrative of such water-solubilizing components are the following:

$$\underset{\underset{}{}}{CH_2}=\underset{\underset{R^5}{|}}{C}-\underset{\underset{}{}}{\overset{\overset{O}{\|}}{C}}NH_2;$$

$$\underset{\underset{}{}}{CH_2}=\underset{\underset{R^5}{|}}{C}-\underset{\underset{}{}}{\overset{\overset{O}{\|}}{C}}OH; \text{ and}$$

$$CH_2=CHO\overset{\overset{O}{\|}}{C}CH_3$$

wherein $R^5$ is $CH_3-$ or $H-$. The third example of vinylacetate would require hydrolysis of the acetyl group to produce sufficient vinyl alcohol moieties to be water-soluble.

Other water solubilizing components are known to those skilled in the chemical arts. Illustrative olefinically unsaturated monomeric components which can be included in making the polymer (C) structure, include vinyl acetate (not later hydrolyzed), vinyl propionate, vinyl butyrate, styrene, alpha-methyl styrene, maleic anhydride, fumaric acid, methyl fumarate, p-chloro-styrene, methyl acrylate, methyl methacrylate, 1-hydroxy propyl acrylate, 2-hydroxyethyl acrylate, and the like.

Relative molar amounts of water-soluble polymer reactants, hydrophobic and complex hydrophobic reactants and connecting monomers may very depending upon the reaction process used. Bonding of complex hydrophobic reactants into polyfunctional water-soluble polymer reactants having a plurality of functional side groups can be conducted with an amount sufficient to produce polymers having complex hydrophobic groups providing for enhanced thickening of aqueous solutions containing such polymers.

The temperature during the polymerization reaction may vary depending upon the particular type of polymers being produced. For the preferred polyethers, a convenient range is from about 40° C. to about 120° C., preferably from about 60° C. to about 110° C. The reaction temperature should be selected to obtain a reasonably fast reaction rate while avoiding undesirable side reactions. The water-soluble organic polymer product may be isolated from the reaction medium by procedures well established in the art, including evaporation, distillation, precipitation, filtration and other isolation procedures.

Suitable adjuvants may be provided during the formation of water-soluble, thermoplastic, organic polymers of this invention including solvents and catalysts well known to those skilled in the art.

In general catalysts are chosen which enhance the type of chemistry employed to product the polymers of this invention.

The free radical addition polymerization method can be accomplished by either thermally generated free radicals or by use of a redox system. Frequently employed free radical catalysts include persulfates, perphoshates, perborates, hydrogen peroxide, organic acyl peroxides, organic diacyl peroxides, organic hydroperoxides and organic azo compounds, and the like. In redox systems the reductants may be sulfites, sodium formaldehyde sulfoxylate, ascorbic acid, and the like; trace amounts of polyvalent metal ions, such as $Fe^{++}$ ion, can be used to further activate the catalyst in these systems. In addition chain transfer agents such as mercaptans may be used to regulate the molecular weight and molecular weight distribution of the final polymer.

In the condensation polymerization method catalysts are again chosen based on the type of chemistry being employed. Thus, for polyesters made by direct esterification the well known acid or base catalysts may suffice, while for transesterification metal alkoxides or organic metal salts such as alkyl titanates, aluminates, stannates, plumbates, and the like may be used.

An enhancement of thickening (herein termed "co-thickening") can result upon the addition of a surfactant to an aqueous system containing the polymer of this invention. In some cases the thickening can be enhanced up to about 40 times the viscosity afforded by the polymer alone. A wide range of surfactants may be used in an amount of about 0.1 to 0.5 parts surfactant per part polymer, same basis.

On the basis of an aqueous system containing about 0.1 to 5% by weight of polymer solids, a useful amount of surfactant for optimum co-thickening is about 0.1 to 1.0% by weight of the total system. As indicated, the amounts of polymer and surfactant cothickener may very widely, even outside these ranges, depending on polymer and surfactant type and other components of the aqueous system to be thickened. However, the co-thickening can reach a maximum as surfactant is added and then decreased. Hence, it may be uneconomical to employ surfactant in amounts outside the stated concentrations and polymer/surfactant ratios, but this can be determined in a routine manner in each case.

The surfactants which may be used include nonionics and anionics, singly or in combination, the selection necessarily depending upon compatibility with other ingredients of the thickened or thickenable dispersions of this invention. Cationic and amphoteric surfactants may also be used provided they are compatible with the copolymer and other ingredients of the aqueous system, or are used in such small amounts as not to cause incompatibility.

Suitable anionic surfactants that may be used include the higher fatty alcohol sulfates such as the sodium or potassium salt of the sulfates of alcohols having from 8 to 18 carbon atoms, alkali metal salts or amine salts of high fatty acid having 8 to 18 carbon atoms, and sulfonated alkyl aryl compounds such as sodium dodecyl benzene sulfonate. Examples of nonionic surfactants include alkylphenoxypolyethoxyethanols having alkyl groups of about 7 to 18 carbon atoms and about 9 to 40 or more oxyethylene units such as octylphenoxypolyethoxyethanols, dodecylphenoxypolyethoxyethanols; ethylene oxide derivatives of long-chain carboxylic acids, such as lauric, myristic, palmitic, oleic; ethylene oxide condensates of long-chain alcohols such as lauryl or cetyl alcohol, and the like.

Examples of cationic surfactants include lauryl pyridinium chloride, octylbenzyltrimethylammonium chloride, dodecyltrimethylammonium chloride condensates of primary fatty amines and ethylene oxide, and the like.

The foregoing and numerous other useful nonionic, anionic, cationic, and amphoteric surfactants are described in the literature, such as McCutcheon's Detergents & Emulsifiers 1981 Annual, North America Edition, MC Publishing Company, Glen Rock, N.J. 07452, U.S.A., incorporated herein by reference.

In general, solvents and non-solvents (or mixtures of solvents, non-solvents, other organics and volatiles) can be used to manipulate the viscosity of polymer containing systems. In the examples herein, it is interesting to note how mineral spirits act like co-thickener, and how the water solubility of the other solvent influences how much mineral spirits can be added before the solution separates into a two phase system. The co-thickening with mineral spirits has utility in textile printing pastes, and in waterborne automotive basecoats. These systems usually contain mineral spirits (because of the pigments used therein), so that the mineral spirits provide a economical way of increasing viscosity and improving the efficiency of the thickener.

As used herein, the term "complex hydrophobe" is contemplated to include all permissible hydrocarbon compounds having 2 or more hydrophobe groups, e.g., bis-dodecylphenyl, bis-nonylphenyl, bis-octylphenyl and the like.

For purposes of this invention, the term "hydrocarbon" is contemplated to include all permissible compounds having at least one hydrogen and one carbon atom. In a broad aspect, the permissible hydrocarbons include acyclic and cyclic, branched and unbranched, carbocyclic and heterocyclic, aromatic and nonaromatic organic compounds which can be substituted or unsubstituted.

As used herein, the term "substituted" is contemplated to include all permissible substituents of organic compounds unless otherwise indicated. In a broad aspect, the permissible substituents include acyclic and cyclic, branched and unbranched, carbocyclic and heterocyclic, aromatic and nonaromatic substituents of organic compounds. Illustrative substituents include, for example, alkyl, alkyloxy, aryl, aryloxy, hydroxy, hydroxyalkyl, amino, aminoalkyl, halogen and the like in which the number of carbons can range from 1 to about 20 or more, preferably from 1 to about 12. The permissible substituents can be one or more and the same or different for appropriate organic compounds. This invention is not intended to be limited in any manner by the permissible substituents of organic compounds.

The invention is illustrated by certain of the following examples.

EXAMPLE 1

Preparation of 1,3-Bis(nonylphenoxy)-2-propanol

To a five neck, two liter round bottom flask equipped with an addition funnel, thermometer, nitrogen dispersant tube, mechanical stirrer, and a decanting head with a water-cooled condenser were added 220 grams (1.00 mole) of nonylphenol and 250 milliliters of cyclohexane. The solution was then heated to reflux and 2.8 grams (1.3 wt. % based on nonylphenol) of potassium hydroxide in 10 milliliters of water was slowly added to the flask. After essentially all the water was recovered in the decanting head (10 milliliters + 1 milliliter formed), 250.7 grams (0.91 mole) of nonylphenyl glycidyl ether as added dropwise. During the addition of the glycidyl ether, the reaction temperature was maintained between 60° and 80° C. After the addition was complete, the solution was refluxed for four hours. The contents of the flask were then washed with a five percent aqueous solution of phosphoric acid, and the organic layer was separated from the water layer and washed twice with deionized water. The reaction mixture was then placed in a one liter round bottom flask, and the remaining cyclohexane and unreacted nonylphenol were recovered by distillation, first at atmospheric pressure, then under vacuum at 0.2 mm Hg. The kettle temperature was not allowed to exceed 180° C. during the distillation to prevent discoloration of the product. The concentrated solution was then refiltered to give 425 grams of a pale-yellow liquid. End-group MW analysis gave a molecular weight of 506.8 (theoretical MW=496.8). Ir and nmr spectra were identical to previously recorded spectra for the compound.

EXAMPLE 2

Preparation of 1,3-Bis(nonylphenoxy)-2-propanol

To a five neck, two liter round bottom flask, equipped with an addition funnel, thermometer, nitrogen dispersant tube, mechanical stirrer, and a decanting head with a water-cooled condenser, were added 300 milliliters of cyclohexane and 451.7 grams (2.05 mole) of nonylphenol. The solution was then heated to reflux and 58.9 grams (1.05 mole) of potassium hydroxide in 60 milliliters of water was slowly added via the addition funnel. After essentially all the water was recovered in the decanting head (60 milliliter + 19 milliliters formed), the reaction was cooled to 40° C., and 92.5 grams (1.00 mole) of epichlorohydrin was slowly added. During the addition, the reaction temperature was maintained below 60° C. by controlling the rate of epichlorohydrin addition. After all the epichlorohydrin was added, the solution was allowed to stir for one hour, and then brought to reflux for an additional three hours. The reaction mixture was then filtered under vacuum through a steam-jacketed Buchner funnel to remove the potassium chloride formed as a by-product. The filtration process was performed a total of three times to remove the majority of the salts. The reaction mixture was then placed in a one liter round bottom flask, and the remaining cyclohexane and unreacted nonylphenol were recovered by distillation, first at atmospheric pressure, then under vacuum at 0.2 mm Hg. The kettle temperature was not allowed to exceed 180° C. during the distillation to prevent discoloration of the product. The concentrated solution was then refiltered to give 275 grams of a pale-yellow liquid. End-group MW analysis gave a molecular weight of 459.7 (theoretical MW=496.8). Ir and nmr spectra were identical to previously recorded spectra for the compound.

EXAMPLE 3

Preparation of 5 Mole Ethoxylate of 1,3-Bis(nonylphenoxy)-2-propanol

To a 500 milliliter, stainless steel, high pressure autoclave was charged 200 grams (0.40 mole) of 1,3-bis(nonylphenoxy)-2-propanol, which contained a catalytic amount of the potassium salt of the alcohol as described in Example 1. After purging the reactor with nitrogen, the alcohol was heated to 130° C. with stirring, and 86.9 grams (2.0 mole) of ethylene oxide was added over a two hour period. The reaction temperature and pressure were maintained from 130° C. to 140° C. and 60 psig during the course of the reaction. After the addition of ethylene oxide was complete, the reaction mixture was held at 140° C. for an additional hour to allow all the ethylene oxide to cook out. The reaction mixture was dumped while hot, under nitrogen, and neutralized with acetic acid to yield 285 grams of a pale-yellow liquid.

EXAMPLE 4

Preparation of Adduct of Nonylphenyl Glycidyl Ether and 5 Mole Ethoxylate of 1,3-Bis (nonylphenoxy)-2-propanol To a five neck, one liter, round bottom flask equipped as in Example 1 was added 119.8 grams (0.17 mole) of the 5 mole ethoxylate of 1,3-bis(nonylphenoxy)-2-propanol and 100 milliliters of cyclohexane. The mixture was refluxed (100° C.) for one hour to remove residual water, and then cooled to 50° C. under nitrogen to add 0.5 grams of $BF_3)Et_2O$. Nonylphenyl glycidyl ether (46.0 grams, 0.17 mole) was then added to the flask over a one hour period, and the reaction was heated to reflux. After three hours at reflux, the reaction mixture was transferred to a separatory funnel, while hot, and washed with a saturated aqueous solution of sodium bicarbonate. The organic layer was separated from the water layer, and washed twice with hot deionized water. The washes were performed at 50° C. to facilitate the separation of the two layers. The water and cyclohexane were then evaporated from the organic layer, under vacuum, to yield 145 grams of a pale-yellow, viscous liquid. End-group molecular weight analysis gave a molecular weight of 880 (theoretical molecular weight=993).

EXAMPLE 5

Preparation of Poly(nonylphenol glycidyl ether)

To a 500 milliliter round bottom equipped with an overhead stirrer, nitrogen inlet, reflux condenser, additional funnel, and temperature controller was charged 1.9 grams of ethanol (22 mmoles) and 200 grams of cyclohexane. The solution was brought to 50° C. Once heated, 0.5 milliliters (4 mmoles) of $BF_3/Et_2O$ was added using a 2 milliliter syringe. Once the acid was added, 100.0 grams of nonylphenol glycidyl ether (362 mmoles) was added dropwise so as to maintain a reaction temperature of 45° C.–55° C. Once the glycidyl ether was added, the solution is refluxed for 3 hours, then cooled to about 50° C.

While hot (<60° C.) the organic was transferred to a separatory funnel and was washed once with 100 milliliters of 5% sodium bicarbonate solution. The aqueous layer was drained and the organic was washed two more times with 100 milliliter portions of deionized water. The aqueous layers were decanted and the organic was dried for at least 1 hour over magnesium sulfate. Once dry the magnesium sulfate was filtered from the organic which was stripped of solvent using a rotary evaporator. The final yield of viscous polymer was 100 grams. The GPC molecular weight was $Mw=2600$ and the $Mn=1700$ based on monodisperse polystyrene standards.

EXAMPLE 6

Ethoxylation of Poly(nonylphenol glycidyl ether)

To a 500 milliliter stainless steel Zipperclave was added 60.0 grams (0.035 moles based on an approximate molecular weight of 1700 gram/mole) of the resin prepared in Example 5 along with 0.5 grams of potassium hydroxide. The vessel was attached to an automated ethoxylation unit and was heated to 50° C. The vessel was continuously purged with nitrogen for 15 minutes and was then heated to 100° C. where it was again continuously purged with nitrogen for another 15 minutes. The vessel was then heated to 140° C. and was given a series of 6 purges by pressuring the vessel up to 80 psi, and then venting. Once the venting process was complete, the vessel was pressured to 20 psi with nitrogen.

The ethylene oxide lines were opened to the motor valves along with the main feed line on the Zipperclave. The feed was continued and the vessel pressure was regulated at 55 psi and a temperature of 140° C. The automation was designed to hold the temperature and the pressure within safe operating limits while addition of ethylene oxide proceeded through a pair of motor control valves. The feed was allowed to continue until 60.0 grams of ethylene oxide (1.362 moles) was added based on a difference weight of the feed cylinder. After the feed was complete, the reaction was allowed to continue for 1 hour after which the vessel was cooled to 60° C., purged 4 times with nitrogen to 80 psi and was dumped to a container. The final product yield was 115 grams with a theoretical yield of 120 grams. The GPC molecular weight of the product was $Mw=3550$ and the $MN=2930$ based on monodisperse polystyrene standards.

EXAMPLE 7

Preparation of Poly(phenyl glycidyl ether)

To a 500 milliliter round bottom equipped with an overhead stirrer, nitrogen inlet, reflux condenser, addition funnel, and temperature controller was charged 47.06 grams of phenol (500 mmoles) and 100 grams of toluene. The solution was brought to 50° C. Once heated, 1.0 milliliter (8 mmoles) of $BF_3/Et_2O$ was added using a 2 milliliter syringe. Once the acid was added, 68.18 grams of phenyl glycidyl ether (454 mmoles) was added dropwise so as to maintain a reaction temperature of 45° C.—55° C. Once the glycidyl ether was added, the solution is refluxed for 3 hours, then cooled to about 50° C.

While hot (<60° C.) the organic was transferred to a separatory funnel and was washed once with 100 milliliters of 5% sodium bicarbonate solution. The aqueous layer was drained and the organic was washed two more times with 100 milliliter portions of deionized water. The aqueous layers were decanted and the organic was dried for at least 1 hour over magnesium sulfate. Once dry the magnesium sulfate was filtered from the organic which was stripped of solvent using a rotary evaporator. The final yield of viscous polymer was 90.3 grams (with 11% unreacted phenol). The GPC molecular weight was $Mw=470$ and the $Mn=310$ (on average a trimer) based on monodisperse polystyrene standards.

EXAMPLE 8

Preparation of 1,3-Bis(phenoxy)-2-propanol using the Cascading Polyol Technique

To a 1 liter round bottom flask equipped with an overhead stirrer, nitrogen inlet, reflux condenser, addition funnel, and temperature controller was charged 94.11 grams of phenol (1 mole), 12.86 grams of tetraethylammonium iodide (0.05 moles), 3.00 grams of water (0.17 moles), 42.08 grams of potassium hydroxide (0.75 moles), and 250 grams of toluene. To a 100 milliliter additional funnel was charged 23.13 grams of epichlorohydrin (0.25 moles) and 50 grams of toluene. The solution was brought to 65° C. at which time the epichlorohydrin solution was added over a period of 15 minutes while maintaining a reaction temperature of 65° C.±5° C. The reaction was allowed to proceed for 48 hours.

After 48 hours, the solution was cooled down to room temperature. The toluene solution was washed with two 250 milliliters portions of deionized water. The aqueous layers were drained off, and the toluene was removed along with unreacted phenol using a rotary evaporator. The final yield of product was 64.5 grams which was 106% of theory (residual is phenol). Final product purity was about 95% as shown by GPC.

EXAMPLE 9

Dimerization of 1,3-Bis(phenoxy)-2-propanol using the Cascading Polyol Technique To a 250 milliliter round bottom flask equipped with an overhead stirrer, nitrogen inlet, reflux condenser, additional funnel, and temperature controller was charged 20.03 grams of 1,3-bis-(phenoxy)-2-propanol prepared in Example 8 (82 mmoles), 2.06 grams of tetraethylammonium iodide (8 moles), 0.49 grams of water (27 moles), 6.51 grams of potassium hydroxide (116 moles), and 125 grams of toluene. To a 100 milliliter addition funnel was charged 3.61 grams of epichlorohydrin (39 moles) and 25 grams of toluene. The solution was brought to 65° C. at which time the epichlorohydrin solution was added over a period of 15 minutes while maintaining a reaction temperature of 65° C.±5° C. The reaction was allowed to proceed for 48 hours.

After 48 hours, the solution was cooled down to room temperature. The toluene solution was washed with two 250 milliliter portions of deionized water. The aqueous layers were drained off, and the toluene was removed using a rotary evaporator. The final yield of product was 21.6 grams which was 101% of theory. GPC showed two major components of the product. The first was the starting material at about 41% ($M_n=220$) and the second was the coupled product at about 59% ($M_n=520$).

EXAMPLE 10

Preparation of 1,3-Bis(hexadecyloxy)-2-propanol using the Cascading Polyol Technique To a 500 milliliter round bottom flask equipped with an overhead stirrer, nitrogen inlet, reflux condenser, additional funnel, and temperature controller was charged 60.61 grams of hexadecanol (0.25 moles), 6.18 grams of tetraethylammonium iodide (0.024 moles), 1.44 grams of water (0.082 moles), 20.20 grams of potassium hydroxide (0.36 moles), and 125 grams of toluene. To a 100 milliliter addition funnel was charged 11.10 grams of epichlorohydrin (0.12 moles) and 25 grams of toluene. The solution was brought to 65° C. at which time the epichlorohydrin solution was added over a period of 15 minutes while maintaining a reaction temperature of 65° C.±5° C. The reaction was allowed to proceed for 48 hours.

After 48 hours, the solution was cooled down to room temperature. The toluene solution was washed with two 250 milliliter portions of deionized water. The aqueous layers were drained off, and the toluene was removed using a rotary evaporator. The final yield of product was 70.9 grams which is 109% of theory (residual is hexadecanol).

EXAMPLE 11

Sulfation of 1,3-Bis(nonylphenoxy)-2-propanol-block-(propylene oxide)$_{10}$-block-(ethylene oxide)$_{10}$ To a 250 milliliter round bottom flask equipped with an overhead stirrer, a temperature controller, and a vacuum adapter was added 75.0 grams of the material from Example 13 (49 mmoles). The kettle was then evacuated to <20 mmHg and heated to 100° C. to remove any water. After 1 hour, the kettle was cooled to 60° C. while under vacuum. When reaching 60° C., vacuum was broken with nitrogen and 5.3 grams of sulfamic acid (54 mmoles) was added. After charging the sulfamic acid, the kettle was heated to 110° C. and evacuated to <20 mmHg. The reaction was allowed to proceed for 3 hours.

At the end of the hold period, the kettle was cooled to 85° C. and vacuum was broken with nitrogen. 1.2 grams of diethanolamine (11 mmoles) was slowly added under a blanket of nitrogen. This solution was stirred for 30 minutes. 10 grams of ethanol was added to the kettle and the temperature was regulated to 55° C. This solution was stirred for 30 minutes. The heat was removed from the kettle and 30 grams of water along with 20 grams of ethanol were added while maintaining good agitation. The solution was stirred for 15 minutes or until cooled to room temperature (<35° C.).

The pH was checked by dissolving 2 grams of the product solution in 18 grams of deionized water. If the pH was below 6.5, 0.2 gram increments of diethanolamine was added until the pH is between 6.5 and 7.5.

EXAMPLE 12

Preparation of 1,3-Bis(nonylphenoxy)-2-propanol-block-(propylene oxide)$_{10}$

To a 500 milliliter stainless steel Zipperclave was added 100.0 grams (0.202 moles) of 1,3-bis(nonylphenoxy)-2-propanol prepared in Example 1 along with 0.7 grams of potassium hydroxide. The vessel was attached to an automated unit and was heated to 50° C. The vessel was continuously purged with nitrogen for 15 minutes and was then heated to 100° C. where it was again continuously purged with nitrogen for another 15 minutes. The vessel was then heated to 140° C. and is given a series of 6 purges by pressuring the vessel up to 80 psi, and then venting. Once the venting process was completed, the vessel was pressured to 20 psi with nitrogen.

Lines connected to a cylinder which had been precharged with 117.0 grams of propylene oxide (2.02 moles) were opened to the motor valves along with the main feed line on the Zipperclave. The feed was continued and the vessel pressure was regulated at 55 psi and a temperature of 140° C. The automation was designed to hold the temperature and the pressure within safe operating limits while addition of ethylene oxide proceeded through a pair of motor control valves. The feed was allowed to continue until all of the propylene oxide had been fed. After the feed was complete, the reaction was allowed to continue for 1 hour after which the vessel was cooled to 60° C., purged 4 times with nitrogen to 80 psi and was dumped to a container. The final product yield was 211 grams with a theoretical yield of 277 grams. The GPC molecular weight of the product was $M_w=650$ and the $M_n=490$ based on monodisperse polystyrene standards.

EXAMPLE 13

Preparation of 1,3-Bis(nonylphenoxy)-2-propanol-block-(propylene oxide)$_{10}$-block-(ethylene oxide)$_{10}$ To a 500 milliliter stainless steel Zipperclave was added 75.0 grams of the propoxylate prepared in Example 12 (0.070 moles) along with 0.3 grams of potassium hydroxide. The vessel was attached to an automated ethoxylation unit and was heated to 50° C. The vessel was continuously purged with nitrogen for 15 minutes and was then heated to 100° C. where it was again continuously purged with nitrogen for another 15 minutes. The vessel was then heated to 140° C. and was given a series of 6 purges by pressuring the vessel up to 80 psi, and then venting. Once the venting process was completed, the vessel was pressured to 20 psi with nitrogen.

The ethylene oxide lines were opened to the motor valves along with the main feed line on the Zipperclave. The feed was continued and the vessel pressure was regulated at 55 psi and a temperature of 140° C. The automation was designed to hold the temperature and the pressure within safe operating limits while addition of ethylene oxide proceeded through a pair of motor control valves. The feed was allowed to continue until 30.7 grams ethylene oxide (0.696 moles) was added based on a difference weight of the feed cylinder. After the feed was complete, the reaction is allowed to continue for 1 hour after which the vessel was cooled to 60° C., purged 4 times with nitrogen to 80 psi and was dumped to a container. The final product yield was 99 grams with a theoretical yield of 106 grams.

EXAMPLE 14

Preparation of Bis(nonylphenoxy) Adduct of 1,4-Butanediol Diglycidyl Ether

To a five neck, two liter round bottom flask equipped with an addition funnel, thermometer, nitrogen dispersant tube, mechanical stirrer, and a decanting head with a water-cooled condenser were added 506.8 grams (2.30 mole) of nonylphenol and 350 milliliters of cyclohexane. The solution was heated to reflux, and 6.5 grams (1.3 weight percent based on nonylphenol) of potassium hydroxide in 15 milliliters of water was slowly added to the round bottom flask. After all the water was recovered in the decanting head (15 milliliters+2 milliliters formed), 220 grams (1.09 mole) of 1,4-butanediol diglycidyl ether was added dropwise between 60 and 80° C. After the addition was complete, the solution was refluxed for four hours. The contents of the flask were then washed with a five percent aqueous solution of phosphoric acid, and the organic layer was separated from the water layer and washed twice with deionized water. The reaction mixture was then placed in a one liter round bottom flask, and the remaining cyclohexane and unreacted nonylphenol were recovered by distillation, first at atmospheric pressure, then under vacuum at 0.2 mm Hg. The kettle temperature was not allowed to exceed 180° C. during the distillation to prevent discoloration of the product. The concentrated solution was then refiltered to give 710 grams of a pale-yellow liquid. Molecular weight by end-group MW analysis was 689.9 (theoretical MW=643.0). Ir and nmr spectra were consistent with the expected structure of the product.

EXAMPLE 15

Preparation of 3 Mole Ethoxylate of 1,3-Bis(nonylphenoxy)-2-propanol

To a five hundred milliliter Zipperclave reactor were charged, under nitrogen, 200.1 grams (0.43 mole) of 1,3-bis(nonylphenoxy)-2-propanol prepared in Example 2 and 0.20 grams (0.1 weight percent) of $BF_3.Et_2O$. The reaction mixture was heated to 80° C., and 55.1 grams (1.25 mole) of ethylene oxide was fed to the reactor over a two hour period. After all the ethylene oxide was fed, the reaction mixture was allowed to cook out for one hour and then dumped hot, under nitrogen, into a jar containing 160 milliliters of a one percent aqueous solution of sodium hydroxide. The organic layer was separated from the water layer and washed twice with deionized water. The washes were performed at 90° C. to facilitate the separation of the two layers. The product was then dried by azeotropic removal of the water, using cyclohexane (300 milliliters) as the entrainer. The cyclohexane was stripped off under vacuum to give a pale-yellow liquid with a molecular weight by end-group MW analysis of 601.7 (theoretical MW=629). Ir and nmr spectra were consistent with the expected structure of the product.

EXAMPLE 16

Preparation of 8 Mole Ethoxylate of Bis(nonylphenoxy) Adduct of 1,4-Butanediol Diglycidyl Ether To a five hundred milliliter Zipperclave reactor were charged, under nitrogen, 150.2 grams (0.22 mole) of bis(nonylphenoxy) adduct of 1,4-butanediol diglycidyl ether prepared in Example 14 and 0.30 grams (0.2 weight percent) of $BF_3.Et_2O$. The reaction mixture was heated to 80° C., and 77.5 grams (1.76 mole) of ethylene oxide was fed to the reactor over a two hour period. After all the ethylene oxide was fed, the reaction mixture was allowed to cook out for one hour and then dumped hot, under nitrogen, into a jar containing 160 milliliters of a one percent aqueous solution of sodium hydroxide. The organic layer was separated from the water layer and washed twice with deionized water. The washes were performed at 90° C. to facilitate the separation of the two layers. The product was then dried by azeotropic removal of the water, using cyclohexane (300 milliliters) as the entrainer. The cyclohexane was stripped off under vacuum to give a pale-yellow liquid with a molecular weight by end-group MW analysis of 1047 (theoretical MW=995). Ir and nmr spectra were consistent with the expected structure of the product.

EXAMPLE 17

Preparation of Macromonomer Compound

Into a 1 liter round bottom reaction flask equipped with a heating mantle, dean stark trap, condenser, thermometer, nitrogen bubbler, nitrogen purge line and stirrer was charged 300 grams of toluene and 63 grams of a surfactant identified as S-1 in Table A below. With nitrogen purge, the resulting solution was heated to reflux at approximately 110° C. and azeotroped to remove trace water to dryness. The solution was subsequently cooled to 90° C., and 1.5 grams of bismuth hex chem 28% bismuth octoate catalyst (Mooney Chemical, Inc., Cleveland, Ohio) was charged and allowed to mix well, after which a stoichiometric amount of 95% m-TMI aliphatic isocyanate (American Cyanamid, Stamford, Conn.) was charged. After the reaction proceeded at 90° C. for 1.3 hours, the resulting product was cooled to 70° C. and 0.03 grams of 2,6-di-tert-4-methyl phenol (BHT) preservative was added. The mixture was poured into a stainless steel pan with large surface area to facilitate drying. The final product was a waxy material, and is designated herein as macromonomer M-1.

TABLE A

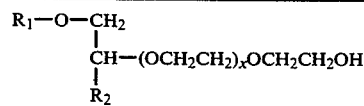

$R_2$ = hydrogen or a $R_3$—O—$CH_2$— residue.

| Surfactant | $R_1$ | $R_2/R_3$ | Moles of Ethoxylation |
|---|---|---|---|
| S-1 | Nonylphenol | Hydrogen ($R_2$) | 40 |
| S-2 | Nonylphenol | Nonylphenol ($R_3$) | 40 |
| S-3 | Nonylphenol | Nonylphenol ($R_3$) | 20 |
| S-4 | Nonylphenol | Octylphenol ($R_3$) | 20 |
| S-5 | Nonylphenol | Octylphenol ($R_3$) | 40 |
| S-6 | Nonylphenol | Nonylphenol ($R_3$) | 80 |
| S-7 | Nonylphenol | Nonylphenol ($R_3$) | 120 |

EXAMPLE 18-34

Preparation of Macromonomer Compounds

In a manner similar to that described in Example 17, other macromonomers were prepared using stoichiometric amounts of the surfactants and unsaturated compounds identified in Table B below.

TABLE B

| Example No. | Surfactant | Unsaturated Compound | Macromonomer Designation |
|---|---|---|---|
| 18 | S-2 | m-TMI | M-2 |
| 19 | S-3 | m-TMI | M-3 |
| 20 | S-4 | m-TMI | M-4 |
| 21 | S-5 | m-TMI | M-5 |
| 22 | S-6 | m-TMI | M-6 |
| 23 | S-7 | m-TMI | M-7 |
| 24 | S-2 | Isocyanato Ethyl Methacrylate | M-8 |
| 25 | S-5 | Isocyanato Ethyl Methacrylate | M-9 |
| 26 | S-1 | Methacrylic Anhydride | M-10 |
| 27 | S-2 | Methacrylic Anhydride | M-11 |
| 28 | S-5 | Methacrylic Anhydride | M-12 |
| 29 | S-6 | Methacrylic Anhydride | M-13 |
| 30 | S-2 | Acrylic Anhydride | M-14 |
| 31 | S-5 | Acrylic Anhydride | M-15 |
| 32 | S-6 | Acrylic Anhydride | M-16 |
| 33 | S-2 | Crotonic Anhydride | M-17 |
| 34 | S-5 | Maleic Anhydride | M-18 |

EXAMPLE 35

Preparation of Alkali Soluble Thickener

A monomer mixture (300 grams) was prepared by charging ethyl acrylate (Aldrich), methacrylic acid (Aldrich), macromonomer M-1, 13 grams of a 75% solution of Aerosol ® OT surfactant (American Cyanamid, Stamford, Conn.), and 3 grams of distilled deionized water to a bottle, and dispersing the contents with vigorous shaking. The ethyl acrylate, methacrylic acid and macromonomer M-1 were added in amounts identified in Table C below. A catalyst feed mixture comprised of 0.53 grams of sodium persulfate (Aldrich) and 52.47 grams of water was prepared in another container. To a 2 liter resin flask that had been immersed in a thermostated water bath and equipped with a 4-bladed stainless steel mechanical stirrer, Claisen connecting tube, water condenser, nitrogen sparge and bubble trap, thermometer and monomer and catalyst addition inlets, 1.20 grams of the sodium salt of vinyl sulfonic acid and 658.5 grams of water were charged. The monomer mixture was charged to a 1-liter graduated monomer feed cylinder, and the catalyst solution was charged to a 125 milliliter graduated catalyst feed cylinder. Under nitrogen purge, the reactor was heated to 70° C., whereupon 33 milliliters of the monomer mixture and 3 milliliters of the catalyst feed mixture were charged to the reaction vessel. The reaction vessel was subsequently heated to 80° C. After allowing the monomers to react for 20 minutes to form a seed product, the monomer and catalyst feed mixtures were conveyed to the reaction vessel by FMI pumps via ⅛" teflon tubing at a rate of 1.94 and 0.27 milliliters/minute, respectively, under continuous stirring at a reaction temperature held between 76°–82° C. The reaction was allowed to proceed for another hour, after which the product was cooled and filtered with a 200 mesh nylon cloth. The coagulum was collected from the reaction vessel and filter cloth. Thickening ability of the resulting product was monitored by Brookfield viscosity at 6 rpm by diluting the latex to 0.25%, 0.50% and 0.75% solids, and subsequently neutralizing the product to pH=9.0 with a 95% solution of 2-amino-2-methyl-1-propanol (AMP-95, Angus Chemical Company). The results are given in Table C.

EXAMPLE 36-131

Preparation of Alkali Soluble Thickeners

In a manner similar to that described in Example 35, other alkali soluble thickeners were prepared using the monomers identified in Tables C–J below in the amounts identified in Tables C–J. Table C illustrates the influence of m-TMI-containing macromonomer concentration and ethoxylation on thickening efficiency. Table D illustrates the influence of mixing m-TMI-containing macromonomers of various ethoxylations on thickening efficiency. Table E illustrates the influence of unsaturation type of urethane-containing macromonomers on thickening efficiency. Table F illustrates the influence of macromonomer ester structure and ethoxylation on thickening efficiency. Table G illustrates the influence of acid type end concentration on thickening efficiency. Table H illustrates the influence of polymer glass transition temperature and water solubility on thickening efficiency. Table I illustrates the influence of cross-linkable monomer concentration on thickening efficiency. Table J illustrates the influence of mercaptan on thickening efficiency. As used in Tables C–J below, the following abbreviations have the indicated meanings: MM=Macromonomer; EA=Ethyl Acrylate; MAA=Methacrylic Acid; AA=Acrylic Acid; MA=Methyl Acrylate; t-BA=t-Butyl Acrylate; n—BA=n-Butyl Acrylate; MMA=Methyl Methacrylate; 2-EHP=2-Ethylhexyl Propionate Mercaptan; and 2-HEA=2-Hydroxy Ethyl Acrylate.

TABLE C

| | | Thickener Composition by Weight | | | Brookfield Viscosity (CPS) @ pH = 9.0 | | | Thickener |
|---|---|---|---|---|---|---|---|---|
| Example | Macromonomer | % MM | % EA | % MAA | 0.25% | 0.50% | 0.75% | Designation |
| 35 | M-1 | 10 | 50 | 40 | 90 | 380 | 1,000 | P-1 |
| 36 | M-2 | 5 | 55 | 40 | 270 | 11,400 | 103,600 | P-2 |
| 37 | M-2 | 10 | 50 | 40 | 120 | 3,100 | 60,000 | P-3 |
| 38 | M-2 | 10 | 50 | 40 | 105 | 10,400 | 130,000 | P-3a |
| 39 | K-2 | 20 | 40 | 40 | 25 | 2,150 | 50,500 | P-4 |
| 40 | M-2 | 30 | 30 | 40 | 10 | 790 | 20,000 | P-5 |
| 41 | M-3 | 5 | 55 | 40 | 390 | 2,260 | 17,900 | P-6 |
| 42 | M-3 | 6.5 | 53.5 | 40 | 142 | 1,200 | 18,500 | P-7 |
| 43 | M-3 | 10 | 50 | 40 | 220 | 3,050 | 40.000 | P-8 |
| 44 | M-3 | 20 | 40 | 40 | 75 | 2,350 | 27,500 | P-9 |
| 45 | M-4 | 10 | 50 | 40 | 242 | 4,400 | 39,000 | P-10 |
| 46 | M-5 | 10 | 50 | 40 | 45 | 7,400 | 84,000 | P-11 |
| 47 | M-5 | 20 | 40 | 40 | 34 | 4,450 | 59,000 | P-12 |

TABLE C-continued

| Example | Macromonomer | Thickener Composition by Weight | | | Brookfield Viscosity (CPS) @ pH = 9.0 | | | Thickener Designation |
| --- | --- | --- | --- | --- | --- | --- | --- | --- |
| | | % MM | % EA | % MAA | 0.25% | 0.50% | 0.75% | |
| 48 | M-6 | 5 | 55 | 40 | 460 | 25,500 | 88,000 | P-13 |
| 49 | M-6 | 10 | 50 | 40 | 105 | 39,000 | 150,000 | P-14 |
| 50 | M-6 | 15 | 45 | 40 | 195 | 43,000 | 140,000 | P-15 |
| 51 | M-6 | 20 | 40 | 40 | 125 | 52,500 | 187,000 | P-16 |
| 52 | M-6 | 30 | 30 | 40 | 315 | 56,500 | 162,000 | P-17 |
| 53 | M-7 | 5 | 55 | 40 | 230 | 7,800 | 15,800 | P-18 |
| 54 | M-7 | 10 | 50 | 40 | 900 | 17,400 | 35,000 | P-19 |

TABLE D

| Example | Macromonomer | Thickener Composition by Weight | | | Brookfield Viscosity (CPS) @ pH = 9.0 | | | Thickener Designation |
| --- | --- | --- | --- | --- | --- | --- | --- | --- |
| | | % MM | % EA | % MAA | 0.25% | 0.50% | 0.75% | |
| 55 | M-3:K-6 1:1 | 10 | 50 | 40 | 225 | 24,000 | 85,000 | P-20 |
| 56 | M-2:M-6 1:1 | 10 | 50 | 40 | 135 | 21,200 | 134,000 | P-21 |

TABLE E

| Example | Macromonomer | Thickener Composition by Weight | | | Brookfield Viscosity (CPS) @ pH = 9.0 | | | Thickener Designation |
| --- | --- | --- | --- | --- | --- | --- | --- | --- |
| | | % MM | % EA | % MAA | 0.25% | 0.50% | 0.75% | |
| 57 | M-8 | 5 | 55 | 40 | 250 | 14,800 | 124,000 | P-22 |
| 58 | M-8 | 10 | 50 | 40 | 93 | 11,200 | 125,400 | P-23 |
| 59 | M-8 | 20 | 40 | 40 | 45 | 6,140 | 84,500 | P-24 |
| 60 | M-9 | 5 | 55 | 40 | 275 | 6,200 | 57,000 | P-25 |
| 61 | M-9 | 10 | 50 | 40 | 250 | 10,100 | 80,000 | P-26 |
| 62 | M-9 | 20 | 40 | 40 | 90 | 7,800 | 90,000 | P-27 |
| 63 | M-9 | 30 | 30 | 40 | 45 | 5,200 | 69,000 | P-28 |

TABLE F

| Example | Macromonomer | Thickener Composition by Weight | | | Brookfield Viscosity (CPS) @ pH = 9.0 | | | Thickener Designation |
| --- | --- | --- | --- | --- | --- | --- | --- | --- |
| | | % MM | % EA | % MAA | 0.25% | 0.50% | 0.75% | |
| 64 | M-10 | 10 | 50 | 40 | 130 | 285 | 410 | P-29 |
| 65 | M-11 | 10 | 50 | 40 | 190 | 19,500 | 152,000 | P-30 |
| 66 | M-11 | 20 | 40 | 40 | 120 | 13,500 | 146,000 | P-31 |
| 67 | M-11 | 30 | 30 | 40 | 96 | 8,000 | 73,000 | P-32 |
| 68 | M-12 | 5 | 55 | 40 | 260 | 5,400 | 51,000 | P-33 |
| 69 | M-12 | 10 | 50 | 40 | 175 | 9,200 | 71,000 | P-34 |
| 70 | M-12 | 20 | 40 | 40 | 100 | 7,400 | 77,000 | P-35 |
| 71 | M-12 | 30 | 30 | 40 | 62 | 4,500 | 63,000 | P-36 |
| 72 | M-13 | 5 | 55 | 40 | 320 | 25,600 | 79,000 | P-37 |
| 73 | M-13 | 10 | 50 | 40 | 97 | 28,000 | 125,000 | P-38 |
| 74 | M-13 | 20 | 40 | 40 | 300 | 58,200 | 171,000 | P-39 |
| 75 | M-13 | 30 | 30 | 40 | 730 | 63,000 | 163,000 | P-40 |
| 76 | M-14 | 10 | 50 | 40 | 410 | 22,700 | 130,000 | P-41 |
| 77 | M-14 | 20 | 40 | 40 | 1225 | 44,500 | 168,000 | P-42 |
| 78 | M-14 | 30 | 30 | 40 | 1010 | 42,500 | 180,000 | P-43 |
| 79 | M-15 | 5 | 55 | 40 | 84 | 1,680 | 29,000 | P-44 |
| 80 | M-15 | 10 | 50 | 40 | 350 | 12,000 | 83,000 | P-45 |
| 81 | M-75 | 20 | 40 | 40 | 220 | 24,500 | 122,000 | P-46 |
| 82 | M-15 | 30 | 30 | 40 | 1050 | 33,000 | 133,000 | P-47 |
| 83 | M-16 | 5 | 55 | 40 | 450 | 17,720 | 45,300 | P-48 |
| 84 | M-16 | 10 | 50 | 40 | 1,345 | 27,000 | 98,000 | P-49 |
| 85 | M-16 | 20 | 40 | 40 | 3,450 | 65,800 | 158,000 | P-50 |
| 86 | M-16 | 30 | 30 | 40 | 11,600 | 81,000 | 157,000 | P-51 |
| 87 | M-17 | 10 | 50 | 40 | 410 | 12,000 | 60,000 | P-52 |
| 88 | M-17 | 20 | 40 | 40 | 255 | 10,600 | 46,300 | P-53 |
| 89 | M-17 | 30 | 30 | 40 | 38 | 2,525 | 13,500 | P-54 |
| 90 | M-18 | 5 | 55 | 40 | 100 | 810 | 3,500 | P-55 |
| 91 | M-18 | 10 | 50 | 40 | 110 | 1,420 | 5,940 | P-56 |
| 92 | M-18 | 20 | 40 | 40 | 30 | 870 | 2,425 | P-57 |

TABLE G

| Example | Macromonomer | Thickener Composition by Weight | | | | Brookfield Viscosity (CPS) @ pH = 9.0 | | | Thickener Designation |
|---|---|---|---|---|---|---|---|---|---|
| | | % MM | % EA | % MAA | % AA | 0.25% | 0.50% | 0.75% | |
| 93 | M-2 | 10 | 60 | 30 | 0 | 1520 | 12,200 | 102,000 | P-58 |
| 94 | M-2 | 10 | 70 | 20 | 0 | 45 | 3,800 | 50,000 | P-59 |
| 95 | M-2 | 10 | 80 | 10 | 0 | 10 | <10 | <10 | P-60 |
| 96 | M-2 | 10 | 60 | 0 | 30 | <10 | 95 | 6,800 | P-61 |
| 97 | M-6 | 20 | 60 | 20 | 0 | 15 | 13,500 | 43,500 | P-62 |
| 98 | M-6 | 5 | 65 | 30 | 0 | 210 | 13,000 | 56,500 | P-63 |
| 99 | M-6 | 10 | 60 | 30 | 0 | 77 | 24,000 | 88,000 | P-64 |
| 100 | M-6 | 20 | 50 | 30 | 0 | 17 | 7,600 | 79,000 | P-65 |
| 101 | M-6 | 5 | 45 | 50 | 0 | 130 | 7,060 | 28,000 | P-66 |
| 102 | M-6 | 10 | 40 | 50 | 0 | 86 | 16,700 | 52,500 | P-67 |
| 103 | M-6 | 20 | 30 | 50 | 0 | 130 | 28,000 | 122,000 | P-68 |
| 104 | M-11 | 10 | 70 | 0 | 20 | <10 | 213 | 7300 | P-69 |
| 105 | M-17 | 10 | 50 | 20 | 20 | 710 | 16,500 | 66,000 | P-70 |

TABLE H

| Example | Macromonomer | Thickener Composition by Weight | | | | Brookfield Viscosity (CPS) @ pH = 9.0 | | | Thickener Designation |
|---|---|---|---|---|---|---|---|---|---|
| | | % MM | % EA | % MAA | % Other | 0.25% | 0.50% | 0.75% | |
| 106 | M-2 | 10 | 40 | 40 | 10 MMA | 90 | 5,760 | 82,000 | P-71 |
| 107 | M-2 | 10 | 30 | 40 | 20 MMA | 15 | 1,125 | 55,000 | P-72 |
| 108 | M-2 | 10 | 20 | 40 | 30 MMA | 10 | 207 | 6,000 | P-73 |
| 109 | M-2 | 10 | 0 | 40 | 50 MMA | <10 | <10 | <10 | P-74 |
| 110 | M-2 | 10 | 30 | 40 | 20 styrene | 20 | 310 | 1,330 | P-75 |
| 111 | M-2 | 10 | 40 | 40 | 10 styrene | 95 | 7,540 | 75,500 | P-76 |
| 112 | M-2 | 10 | 40 | 40 | 10 n-BA | 220 | 13,800 | 118,000 | P-77 |
| 113 | M-2 | 10 | 30 | 40 | 20 n-BA | 185 | 7,400 | 66,500 | P-78 |
| 114 | M-2 | 10 | 40 | 40 | 10 t-BA | 130 | 10,100 | 100,000 | P-79 |
| 115 | M-2 | 10 | 30 | 40 | 20 t-BA | 125 | 7,200 | 77,500 | P-80 |
| 116 | M-2 | 10 | 40 | 40 | 10 MA | 100 | 6,900 | 121,000 | P-81 |
| 117 | M-2 | 10 | 30 | 40 | 20 MA | 73 | 5,000 | 90,000 | P-82 |
| 118 | M-6 | 20 | 30 | 40 | 10 MMA | 33 | 15,400 | 150,000 | P-83 |

TABLE I

| Example | Macromonomer | Thickener Composition by Weight | | | | Brookfield Viscosity (CPS) @ pH = 9.0 | | | Thickener Designation |
|---|---|---|---|---|---|---|---|---|---|
| | | % MM | % EA | % MAA | % 2-HEA | 0.25% | 0.50% | 0.75% | |
| 119 | M-2 | 10 | 47.7 | 40 | 2.3 | 97 | 9,060 | 127,000 | P-84 |
| 120 | M-2 | 10 | 57.7 | 30 | 2.3 | 62 | 6,300 | 76,000 | P-85 |
| 121 | M-2 | 20 | 37.5 | 40 | 2.5 | 27 | 6,200 | 116,600 | P-86 |
| 122 | M-2 | 20 | 35 | 40 | 5 | <10 | 260 | 18,600 | P-87 |
| 123 | M-2 | 20 | 32.5 | 40 | 7.5 | 20 | 720 | 40,000 | P-88 |
| 124 | M-2 | 20 | 30 | 40 | 70 | 10 | 520 | 29,500 | P-89 |

TABLE J

| Example | Macromonomer | Thickener Composition by Weight | | | | Brookfield Viscosity (CPS) @ pH = 9.0 | | | Thickener Designation |
|---|---|---|---|---|---|---|---|---|---|
| | | % MM | % EA | % MAA | % 2-HEP* | 0.25% | 0.50% | 0.75% | |
| 125 | M-2 | 10 | 40 | 50 | .05 | 165 | 22,800 | 142,000 | P-90 |
| 126 | M-2 | 10 | 50 | 40 | 0.2 | 18 | 2,060 | 66,500 | P-91 |
| 127 | M-2 | 10 | 50 | 40 | 0.3 | <10 | 115 | 9,700 | P-92 |
| 128 | M-2 | 10 | 50 | 40 | 0.5 | <10 | 12 | 355 | P-93 |
| 129 | M-2 | 10 | 50 | 40 | 1 | <10 | <10 | <10 | P-94 |
| 130 | M-6 | 10 | 50 | 40 | .05 | 230 | 23,700 | 90,700 | P-95 |
| 131 | M-6 | 10 | 50 | 40 | .2 | 30 | 5,170 | 33,000 | P-96 |

*% charged to reactor based on monomer.

EXAMPLE 132–187

Co-Thickening with Surfactants

The addition of certain surfactants to an associative polymer solution produces a co-thickening effect. The results in Table L below show the co-thickening effect produced by the addition with thorough mixing of certain surfactants identified in Table K below in the amounts identified in Table L to a 0.5% alkaline solution of an alkali soluble thickener identified in Table L as measured with a Brookfield Viscometer at 6 rpm at pH=9.0.

TABLE K $$R_1-O-CH_2$$
$$|$$
$$CH-(OCH_2CH_2)_xOCH_2CH_2OH$$
$$|$$
$$R_2$$

$R_2$ = hydrogen or a $R_3-O-CH_2-$ residue.

| Surfactant | $R_1$ | $R_2/R_3$ | Moles of Ethoxylation |
|---|---|---|---|
| S-8 | Nonylphenol | Nonylphenol ($R_3$) | 20 |
| S-9 | Nonylphenol | Nonylphenol ($R_3$) | 40 |
| S-10 | Nonylphenol | Nonylphenol ($R_3$) | 80 |
| S-11 | Nonylphenol | Hydrogen ($R_2$) | 25 |
| S-12 | Nonylphenol | Hydrogen ($R_2$) | 40 |
| S-13 | Nonylphenol | Octylphenol ($R_3$) | 20 |
| S-14 | Nonylphenol | Octylphenol ($R_3$) | 40 |
| S-15* | Nonylphenol | Nonylphenol ($R_3$) | 40 |
| S-16 | Octylphenol | Hydrogen ($R_2$) | 25 |

*Sulfated derivative.

TABLE L

| Example | Surfactant | Surfactant Concentration (wt. %) | Thickener | Brookfield Viscosity (cps) @ pH = 9.0 |
|---|---|---|---|---|
| 132 | S-8 | 0.0 | P-3 | 3100 |
| | S-8 | 0.2 | P-3 | 32700 |
| | S-8 | 0.4 | P-3 | 45700 |
| | S-8 | 0.8 | P-3 | 63300 |
| | S-8 | 1.0 | P-3 | 65500 |
| | S-8 | 2.0 | P-3 | >100000 |
| 133 | S-9 | 0.2 | P-3 | 24200 |
| | S-9 | 0.4 | P-3 | 18700 |
| | S-9 | 0.8 | P-3 | 6600 |
| | S-9 | 1.0 | P-3 | 4060 |
| | | 2.0 | P-3 | 1225 |
| 134 | S-10 | 0.2 | P-3 | 20600 |
| | S-10 | 0.4 | P-3 | 17300 |
| | S-10 | 0.8 | P-3 | 8500 |
| | S-10 | 1.0 | P-3 | 6300 |
| | S-10 | 2.0 | P-3 | 1850 |
| 135 | S-11 | 0.2 | P-3 | 12000 |
| | S-11 | 0.4 | P-3 | 3160 |
| | S-11 | 0.8 | P-3 | 700 |
| | S-11 | 1.0 | P-3 | 485 |
| | S-11 | 2.0 | P-3 | 480 |
| 136 | S-12 | 0.2 | P-3 | 9200 |
| | S-12 | 0.4 | P-3 | 4500 |
| | S-12 | 0.8 | P-3 | 1000 |
| | S-12 | 1.0 | P-3 | 875 |
| | S-12 | 2.0 | P-3 | 565 |
| 137 | S-13 | 0.2 | P-3 | 34300 |
| | S-13 | 0.4 | P-3 | 26700 |
| | S-13 | 0.8 | P-3 | 11500 |
| | S-13 | 1.0 | P-3 | 8600 |
| | S-13 | 2.0 | P-3 | 2450 |
| 138 | S-14 | 0.2 | P-3 | 22200 |
| | S-14 | 0.4 | P-3 | 17200 |
| | S-14 | 0.8 | P-3 | 6900 |
| | S-14 | 1.0 | P-3 | 4500 |
| | S-14 | 2.0 | P-3 | 1500 |
| 139 | S-15 | 0.2 | P-3 | 10500 |
| | S-15 | 0.4 | P-3 | 4940 |
| | S-15 | 0.8 | P-3 | 2160 |
| | S-15 | 1.0 | P-3 | 1450 |
| | S-15 | 2.0 | P-3 | 355 |
| 140 | S-16 | 0.2 | P-3 | 14300 |
| | S-16 | 0.4 | P-3 | 4080 |
| | S-16 | 0.8 | P-3 | 1075 |
| | S-16 | 1.0 | P-3 | 735 |
| | S-16 | 2.0 | P-3 | 485 |
| 141 | S-8 | 0.0 | P-2 | 11400 |
| | S-8 | 0.2 | P-2 | 23500 |
| | S-8 | 0.4 | P-2 | 34000 |
| | S-8 | 0.8 | P-2 | 64000 |
| | S-8 | 1.0 | P-2 | 71000 |
| | S-8 | 2.0 | P-2 | 93000 |
| 142 | S-9 | 0.2 | P-2 | 11000 |
| | S-9 | 0.4 | P-2 | 4000 |
| | S-9 | 0.8 | P-2 | 2000 |
| | S-9 | 1.0 | P-2 | 1400 |
| | S-9 | 2.0 | P-2 | 850 |
| 143 | S-10 | 0.2 | P-2 | 10500 |
| | S-10 | 0.4 | P-2 | 5000 |
| | S-10 | 0.8 | P-2 | 2000 |
| | S-10 | 1.0 | P-2 | 1600 |
| | S-10 | 2.0 | P-2 | 950 |
| 144 | S-11 | 0.2 | P-2 | 2700 |
| | S-11 | 0.4 | P-2 | 1000 |
| | S-11 | 0.8 | P-2 | 800 |
| | S-11 | 1.0 | P-2 | 660 |
| | S-11 | 2.0 | P-2 | 620 |
| 145 | S-12 | 0.2 | P-2 | 2800 |
| | S-12 | 0.4 | P-2 | 1000 |
| | S-12 | 0.8 | P-2 | 850 |
| | S-12 | 1.0 | P-2 | 660 |
| | S-12 | 2.0 | P-2 | 650 |
| 146 | S-8 | 0.0 | P-4 | 2150 |
| | S-8 | 0.2 | P-4 | 19000 |
| | S-8 | 0.4 | P-4 | 31000 |
| | S-8 | 0.8 | P-4 | 55000 |
| | S-8 | 1.0 | P-4 | 61000 |
| | S-8 | 2.0 | P-4 | 85000 |
| 147 | S-9 | 0.2 | P-4 | 19500 |
| | S-9 | 0.4 | P-4 | 21500 |
| | S-9 | 0.8 | P-4 | 11500 |
| | S-9 | 1.0 | P-4 | 7400 |
| | S-9 | 2.0 | P-4 | 2250 |
| 148 | S-10 | 0.2 | P-4 | 12600 |
| | S-10 | 0.4 | P-4 | 17400 |
| | S-10 | 0.8 | P-4 | 12600 |
| | S-10 | 1.0 | P-4 | 6600 |
| | S-10 | 2.0 | P-4 | 2600 |
| 149 | S-11 | 0.2 | P-4 | 17400 |
| | S-11 | 0.4 | P-4 | 7800 |
| | S-11 | 0.8 | P-4 | 1650 |
| | S-11 | 1.0 | P-4 | 860 |
| | S-11 | 2.0 | P-4 | 560 |
| 150 | S-12 | 0.2 | P-4 | 14600 |
| | S-12 | 0.4 | P-4 | 7800 |
| | S-12 | 0.8 | P-4 | 1500 |
| | S-12 | 1.0 | P-4 | 960 |
| | S-12 | 2.0 | P-4 | 450 |
| 151 | S-8 | 0.0 | P-5 | 790 |
| | S-8 | 0.2 | P-5 | 4600 |
| | S-8 | 0.4 | P-5 | 19600 |
| | S-8 | 0.8 | P-5 | 42000 |
| | S-8 | 1.0 | P-5 | 50000 |
| | S-8 | 2.0 | P-5 | 90000 |
| 152 | S-9 | 0.2 | P-5 | 5800 |
| | S-9 | 0.4 | P-5 | 13200 |
| | S-9 | 0.8 | P-5 | 9200 |
| | S-9 | 1.0 | P-5 | 5200 |
| | S-9 | 2.0 | P-5 | 1600 |
| 153 | S-10 | 0.2 | P-5 | 4050 |
| | S-10 | 0.4 | P-5 | 10400 |
| | S-10 | 0.8 | P-5 | 9400 |
| | S-10 | 1.0 | P-5 | 5000 |
| | S-10 | 2.0 | P-5 | 1600 |
| 154 | S-11 | 0.2 | P-5 | 10600 |
| | S-11 | 0.4 | P-5 | 4200 |

TABLE L-continued

| Example | Surfactant | Surfactant Concentration (wt. %) | Thickener | Brookfield Viscosity (cps) @ pH = 9.0 |
|---|---|---|---|---|
|  | S-11 | 0.8 | P-5 | 1400 |
|  | S-11 | 1.0 | P-5 | 970 |
|  | S-11 | 2.0 | P-5 | 410 |
| 155 | S-12 | 0.2 | P-5 | 6000 |
|  | S-12 | 0.4 | P-5 | 4200 |
|  | S-12 | 0.8 | P-5 | 1150 |
|  | S-12 | 1.0 | P-5 | 600 |
|  | S-12 | 2.0 | P-5 | 340 |
| 156 | S-8 | 0 | P-7 | 1200 |
|  | S-8 | 0.2 | P-7 | 9000 |
|  | S-8 | 0.4 | P-7 | 21000 |
|  | S-8 | 0.8 | P-7 | 37000 |
|  | S-8 | 1.0 | P-7 | 49000 |
|  | S-8 | 2.0 | P-7 | 78000 |
| 157 | S-9 | 0.2 | P-7 | 1600 |
|  | S-9 | 0.4 | P-7 | 1350 |
|  | S-9 | 0.8 | P-7 | 900 |
|  | S-9 | 1.0 | P-7 | 762 |
|  | S-9 | 2.0 | P-7 | 565 |
| 158 | S-10 | 0.2 | P-7 | 1100 |
|  | S-10 | 0.4 | P-7 | 1150 |
|  | S-10 | 0.8 | P-7 | 900 |
|  | S-10 | 1.0 | P-7 | 823 |
|  | S-10 | 2.0 | P-7 | 650 |
| 159 | S-11 | 0.2 | P-7 | 1175 |
|  | S-11 | 0.4 | P-7 | 685 |
|  | S-11 | 0.8 | P-7 | 503 |
|  | S-11 | 1.0 | P-7 | 495 |
|  | S-11 | 2.0 | P-7 | 502 |
| 160 | S-12 | 0.2 | P-7 | 950 |
|  | S-12 | 0.4 | P-7 | 675 |
|  | S-12 | 0.8 | P-7 | 525 |
|  | S-12 | 1.0 | P-7 | 500 |
|  | S-12 | 2.0 | P-7 | 480 |
| 161 | S-8 | 0.0 | P-13 | 25500 |
|  | S-8 | 0.2 | P-13 | 31500 |
|  | S-8 | 0.4 | P-13 | 46500 |
|  | S-8 | 0.8 | P-13 | 60000 |
|  | S-8 | 1.0 | P-13 | 60000 |
|  | S-8 | 2.0 | P-13 | 62500 |
| 162 | S-9 | 0.2 | P-13 | 8640 |
|  | S-9 | 0.4 | P-13 | 2940 |
|  | S-9 | 0.8 | P-13 | 1200 |
|  | S-9 | 1.0 | P-13 | 1000 |
|  | S-9 | 2.0 | P-13 | 750 |
| 163 | S-10 | 0.2 | P-13 | 10100 |
|  | S-10 | 0.4 | P-13 | 4200 |
|  | S-10 | 0.8 | P-13 | 1450 |
|  | S-10 | 1.0 | P-13 | 1300 |
|  | S-10 | 2.0 | P-13 | 900 |
| 164 | S-12 | 0.2 | P-13 | 2540 |
|  | S-12 | 0.4 | P-13 | 1125 |
|  | S-12 | 0.8 | P-13 | 750 |
|  | S-12 | 1.0 | P-13 | 670 |
|  | S-12 | 2.0 | P-13 | 610 |
| 165 | S-8 | 0.0 | P-14 | 39000 |
|  | S-8 | 0.2 | P-14 | 61000 |
|  | S-8 | 0.4 | P-14 | 73500 |
|  | S-8 | 0.8 | P-14 | 87000 |
|  | S-8 | 1.0 | P-14 | 93500 |
|  | S-8 | 2.0 | P-14 | 122000 |
| 166 | S-9 | 0.2 | P-14 | 41000 |
|  | S-9 | 0.4 | P-14 | 13700 |
|  | S-9 | 0.8 | P-14 | 6200 |
|  | S-9 | 1.0 | P-14 | 3500 |
|  | S-9 | 2.0 | P-14 | 1200 |
| 167 | S-10 | 0.2 | P-14 | 38200 |
|  | S-10 | 0.4 | P-14 | 20500 |
|  | S-10 | 0.8 | P-14 | 7300 |
|  | S-10 | 1.0 | P-14 | 5400 |
|  | S-10 | 2.0 | P-14 | 1950 |
| 168 | S-12 | 0.2 | P-14 | 13000 |
|  | S-12 | 0.4 | P-14 | 4300 |
|  | S-12 | 0.8 | P-14 | 975 |
|  | S-12 | 1.0 | P-14 | 950 |
|  | S-12 | 2.0 | P-14 | 660 |
| 169 | S-8 | 0.0 | P-16 | 52500 |
|  | S-8 | 0.2 | P-16 | 95000 |
|  | S-8 | 0.4 | P-16 | 92000 |
|  | S-8 | 0.8 | P-16 | 122000 |
|  | S-8 | 1.0 | P-16 | 125000 |
|  | S-8 | 2.0 | P-16 | 138000 |
| 170 | PS-9 | 0.2 | P-16 | 73500 |
|  | PS-9 | 0.4 | P-16 | 53000 |
|  | PS-9 | 0.8 | P-16 | 25000 |
|  | PS-9 | 1.0 | P-16 | 21000 |
|  | PS-9 | 2.0 | P-16 | 5400 |
| 171 | S-10 | 0.2 | P-16 | 52800 |
|  | S-10 | 0.4 | P-16 | 34500 |
|  | S-10 | 0.8 | P-16 | 5400 |
|  | S-10 | 1.0 | P-16 | 2925 |
|  | S-10 | 2.0 | P-16 | 775 |
| 172 | S-13 | 0.2 | P-16 | 45800 |
|  | S-13 | 0.4 | P-16 | 54000 |
|  | S-13 | 0.8 | P-16 | 50800 |
|  | S-13 | 1.0 | P-16 | 54500 |
|  | S-13 | 2.0 | P-16 | 63000 |
| 173 | S-14 | 0.2 | P-16 | 22700 |
|  | S-14 | 0.4 | P-16 | 2480 |
|  | S-14 | 0.8 | P-16 | 710 |
|  | S-14 | 1.0 | P-16 | 532 |
|  | S-14 | 2.0 | P-16 | 415 |
| 174 | S-8 | 0.0 | P-29 | 285 |
|  | S-8 | 0.2 | P-29 | 285 |
|  | S-8 | 0.4 | P-29 | 360 |
|  | S-8 | 0.8 | P-29 | 477 |
|  | S-8 | 1.0 | P-29 | 505 |
|  | S-8 | 2.0 | P-29 | 837 |
| 175 | S-9 | 0.2 | P-29 | 282 |
|  | S-9 | 0.4 | P-29 | 285 |
|  | S-9 | 0.8 | P-29 | 284 |
|  | S-9 | 1.0 | P-29 | 298 |
|  | S-9 | 2.0 | P-29 | 322 |
| 176 | S-10 | 0.2 | P-29 | 272 |
|  | S-10 | 0.4 | P-29 | 278 |
|  | S-10 | 0.8 | P-29 | 285 |
|  | S-10 | 1.0 | P-29 | 297 |
|  | S-10 | 2.0 | P-29 | 315 |
| 177 | S-12 | 0.2 | P-29 | 267 |
|  | S-12 | 0.4 | P-29 | 279 |
|  | S-12 | 0.8 | P-29 | 298 |
|  | S-12 | 1.0 | P-29 | 311 |
|  | S-12 | 2.0 | P-29 | 320 |
| 178 | S-8 | 0.0 | P-30 | 19500 |
|  | S-8 | 0.2 | P-30 | 79000 |
|  | S-8 | 0.4 | P-30 | 71200 |
|  | S-8 | 0.8 | P-30 | 81000 |
|  | S-8 | 1.0 | P-30 | 89500 |
|  | S-8 | 2.0 | P-30 | 175000 |
| 179 | S-9 | 0.2 | P-30 | 52000 |
|  | S-9 | 0.4 | P-30 | 35500 |
|  | S-9 | 0.8 | P-30 | 16500 |
|  | S-9 | 1.0 | P-30 | 15600 |
|  | S-9 | 2.0 | P-30 | 5620 |
| 180 | S-10 | 0.2 | P-30 | 47200 |
|  | S-10 | 0.4 | P-30 | 26300 |
|  | S-10 | 0.8 | P-30 | 20300 |
|  | S-10 | 1.0 | P-30 | 13400 |
|  | S-10 | 2.0 | P-30 | 4700 |
| 181 | S-12 | 0.2 | P-30 | 23000 |
|  | S-12 | 0.4 | P-30 | 6840 |
|  | S-12 | 0.8 | P-30 | 3125 |
|  | S-12 | 1.0 | P-30 | 1750 |
|  | S-12 | 2.0 | P-30 | 1225 |
| 182 | S-8 | 0.0 | P-46 | 24500 |
|  | S-8 | 0.2 | P-46 | 79000 |
|  | S-8 | 0.4 | P-46 | 75000 |
|  | S-8 | 0.8 | P-46 | 86000 |
|  | S-8 | 1.0 | P-46 | 95000 |
|  | S-8 | 2.0 | P-46 | 150000 |
| 183 | S-9 | 0.2 | P-46 | 40500 |
|  | S-9 | 0.4 | P-46 | 31000 |
|  | S-9 | 0.8 | P-46 | 15300 |
|  | S-9 | 1.0 | P-46 | 9400 |
|  | S-9 | 2.0 | P-46 | 2300 |
| 184 | S-11 | 0.2 | P-46 | 20000 |

TABLE L-continued

| Example | Surfactant | Surfactant Concentration (wt. %) | Thickener | Brookfield Viscosity (cps) @ pH = 9.0 |
|---|---|---|---|---|
| | S-11 | 0.4 | P-46 | 7300 |
| | S-11 | 0.8 | P-46 | 1350 |
| | S-11 | 1.0 | P-46 | 900 |
| | S-11 | 2.0 | P-46 | 380 |
| 185 | S-13 | 0.2 | P-46 | 63500 |
| | S-13 | 0.4 | P-46 | 42000 |
| | S-13 | 0.8 | P-46 | 23000 |
| | S-13 | 1.0 | P-46 | 16000 |
| | S-13 | 2.0 | P-46 | 4850 |
| 186 | S-14 | 0.2 | P-46 | 36000 |
| | S-14 | 0.4 | P-46 | 25000 |
| | S-14 | 0.8 | P-46 | 11000 |
| | S-14 | 1.0 | P-46 | 9300 |
| | S-14 | 2.0 | P-46 | 1900 |
| 187 | S-16 | 0.2 | P-46 | 19000 |
| | S-16 | 0.4 | P-46 | 9300 |
| | S-16 | 0.8 | P-46 | 1250 |
| | S-16 | 1.0 | P-46 | 750 |
| | S-16 | 2.0 | P-46 | 290 |

EXAMPLES 188-232

Co-Thickening with Surfactants

The degree of ethoxylation of a surfactant added to an associative polymer solution influences the co-thickening effect. The results in Table N below show the co-thickening effect produced by the addition with thorough mixing of certain surfactants identified in Table M below in the amounts identified in Table N to a 0.3% (Examples 172-189), 0.5% (Examples 190-215) or 0.75% (Example 216) alkaline solution of an alkali soluble thickener identified in Table N as measured with a Brookfield Viscometer at 6 rpm at pH=9.0.

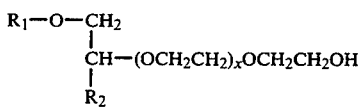

$R_2$ = hydrogen or a $R_3$—O—$CH_2$— residue.

TABLE M

| Surfactant | $R_1$ | $R_2/R_3$ | Moles of Ethoxylation |
|---|---|---|---|
| S-17 | Nonylphenol | Hydrogen ($R_2$) | 4 |
| S-18 | Nonylphenol | Hydrogen ($R_2$) | 6 |
| S-19 | Nonylphenol | Hydrogen ($R_2$) | 7 |
| S-20 | Nonylphenol | Hydrogen ($R_2$) | 8 |
| S-21 | Nonylphenol | Hydrogen ($R_2$) | 9 |
| S-22 | Nonylphenol | Hydrogen ($R_2$) | 10 |
| S-23 | Nonylphenol | Hydrogen ($R_2$) | 15 |
| S-24 | Nonylphenol | Hydrogen ($R_2$) | 25 |
| S-25 | Nonylphenol | Hydrogen ($R_2$) | 40 |
| S-26 | Octylphenol | Hydrogen ($R_2$) | 1 |
| S-27 | Octylphenol | Hydrogen ($R_2$) | 3 |
| S-28 | Octylphenol | Hydrogen ($R_2$) | 5 |
| S-29 | Octylphenol | Hydrogen ($R_2$) | 7 |
| S-30 | Octylphenol | Hydrogen ($R_2$) | 9 |
| S-31 | Octylphenol | Hydrogen ($R_2$) | 12 |
| S-32 | Octylphenol | Hydrogen ($R_2$) | 16 |
| S-33 | C11-C15 Secondary Alcohol | Hydrogen ($R_2$) | 5 |
| S-34 | C11-C15 Secondary Alcohol | Hydrogen ($R_2$) | 9 |

TABLE N

| Example | Surfactant | Surfactant Concentration (wt. %) | Thickener | Brookfield Viscosity (cps) @ pH = 9.0 |
|---|---|---|---|---|
| 188 | S-17 | 0.8 | P-1 | 890 |
| 189 | S-18 | 0.8 | P-1 | 1340 |
| 190 | S-19 | 0.8 | P-1 | 630 |
| 191 | S-20 | 0.8 | P-1 | 205 |
| 192 | S-21 | 0.8 | P-1 | 143 |
| 193 | S-22 | 0.8 | P-1 | 113 |
| 194 | S-23 | 0.8 | P-1 | 85 |
| 195 | S-24 | 0.8 | P-1 | 57 |
| 196 | S-25 | 0.8 | P-1 | 68 |
| 197 | S-17 | 0.8 | P-3 | 17800 |
| 198 | S-18 | 0.8 | P-3 | 35800 |
| 199 | S-19 | 0.8 | P-3 | 21300 |
| 200 | S-20 | 0.8 | P-3 | 820 |
| 201 | S-21 | 0.8 | P-3 | 230 |
| 202 | S-22 | 0.8 | P-3 | 147 |
| 203 | S-23 | 0.8 | P-3 | 118 |
| 204 | S-24 | 0.8 | P-3 | 82 |
| 205 | S-25 | 0.8 | P-3 | 77 |
| 206 | S-17 | 0.8 | P-42 | 57000 |
| 207 | S-18 | 0.8 | P-42 | 134000 |
| 208 | S-19 | 0.8 | P-42 | 112000 |
| 209 | S-21 | 0.8 | P-42 | 2450 |
| 210 | S-22 | 0.8 | P-42 | 800 |
| 211 | S-23 | 0.8 | P-42 | 3250 |
| 212 | S-26 | 0.8 | P-42 | 43000 |
| 213 | S-27 | 0.8 | P-42 | 37000 |
| 214 | S-28 | 0.8 | P-42 | 71000 |
| 215 | S-29 | 0.8 | P-42 | 5800 |
| 216 | S-30 | 0.8 | P-42 | 375 |
| 217 | S-31 | 0.8 | P-42 | 650 |
| 218 | S-32 | 0.8 | P-42 | 2400 |
| 219 | S-17 | 0.8 | P-46 | 68000 |
| 220 | S-18 | 0.8 | P-46 | 13000 |
| 221 | S-19 | 0.8 | P-46 | 88000 |
| 222 | S-21 | 0.8 | P-46 | 2900 |
| 223 | S-22 | 0.8 | P-46 | 1400 |
| 224 | S-23 | 0.8 | P-46 | 2400 |
| 225 | S-26 | 0.8 | P-46 | 25000 |
| 226 | S-27 | 0.8 | P-46 | 38500 |

TABLE N-continued

| Example | Surfactant | Surfactant Concentration (wt. %) | Thickener | Brookfield Viscosity (cps) @ pH = 9.0 |
|---|---|---|---|---|
| 227 | S-28 | 0.8 | P-46 | 77000 |
| 228 | S-29 | 0.8 | P-46 | 7200 |
| 229 | S-30 | 0.8 | P-46 | 550 |
| 230 | S-31 | 0.8 | P-46 | 690 |
| 231 | S-32 | 0.8 | P-46 | 1775 |
| 232 | Aerosol ® OT | 0.0 | P-4 | 50500 |
| | Aerosol ® OT | 0.1 | P-4 | 93500 |
| | Aerosol ® OT | 0.2 | P-4 | 42000 |
| | Aerosol ® OT | 0.4 | P-4 | 11200 |
| | Aerosol ® OT | 0.8 | P-4 | 3700 |
| | Aerosol ® OT | 1.0 | P-4 | 7200 |
| | Aerosol ® OT | 2.0 | P-A | 10600 |

EXAMPLES 233–245

Co-Thickening with Solvents and Non-Solvents

Solvents and non-solvents added to an associative polymer solution influences the co-thickening effect. The results in Table P below show the co-thickening effect produced by the addition with thorough mixing of certain solvents and non-solvents identified in Table O below in the amounts identified in Table P to a 0.75% alkaline solution of an alkali soluble thickener identified in Table P as measured with a Brookfield Viscometer at 6 rpm at pH=9.0.

TABLE O

| Solvent Designation | Solvent |
|---|---|
| O-1 | mineral spirits |
| O-2 | butanol |
| O-3 | Isobutanol |
| O-4 | Isopropanol |
| O-5 | 2-Ethylhexanol |
| O-6 | Butyl Carbitol |
| O-7 | Butyl DiPropasol |
| O-8 | Butyl Propasol |
| O-9 | Propyl DiPropasol |
| O-10 | Propyl Propasol |
| O-11 | Methyl DiPropasol |
| O-12 | Methyl Propasol |

TABLE P

| Example | Thickener | Solvent | Solvent Concentration (wt. %) | Solvent O-1 Concentration (wt. %) | Brookfield Viscosity (cps) @ pH = 9.0 |
|---|---|---|---|---|---|
| 233 | P-3 | O-6 | 5 | 0 | 29200 |
| | P-3 | O-6 | 10 | 0 | 865 |
| | P-3 | O-6 | 20 | 0 | 625 |
| | P-3 | O-6 | 40 | 0 | 720 |
| | P-3 | O-6 | 5 | 5 | 15400 |
| | P-3 | O-6 | 10 | 5 | 1125 |
| | P-3 | O-6 | 20 | 5 | 735 |
| | P-3 | O-6 | 40 | 5 | 780 |
| | P-3 | O-6 | 5 | 10 | 56500 |
| | P-3 | O-6 | 10 | 10 | 1050 |
| | P-3 | O-6 | 20 | 10 | 835 |
| | P-3 | O-6 | 40 | 10 | 832 |
| | P-3 | O-6 | 5 | 20 | 41500 |
| | P-3 | O-6 | 10 | 20 | 1625 |
| 234 | P-3 | O-7 | 0 | 0 | 76000 |
| | P-3 | O-7 | 5 | 0 | 2150 |
| | P-3 | O-7 | 10 | 0 | 3700 |
| | P-3 | O-7 | 20 | 0 | 2000 |
| | P-3 | O-7 | 0 | 5 | 89000 |
| | P-3 | O-7 | 5 | 5 | 88000 |
| | P-3 | O-7 | 10 | 5 | 50000 |
| | P-3 | O-7 | 20 | 5 | 46500 |
| | P-3 | O-7 | 0 | 10 | 102400 |
| | P-3 | O-7 | 5 | 10 | 122000 |
| | P-3 | O-7 | 10 | 10 | 72000 |
| | P-3 | O-7 | 0 | 20 | 113000 |
| | P-3 | O-7 | 5 | 20 | 158000 |
| | P-3 | O-7 | 10 | 20 | 138000 |
| 235 | P-3 | O-8 | 5 | 0 | 1925 |
| | P-3 | O-8 | 10 | 0 | 1150 |
| | P-3 | O-8 | 20 | 0 | 2000 |
| | P-3 | O-8 | 40 | 0 | 6200 |
| 236 | P-3 | O-9 | 5 | 0 | 36000 |
| | P-3 | O-9 | 10 | 0 | 1200 |
| | P-3 | O-9 | 20 | 0 | 440 |
| | P-3 | O-9 | 40 | 0 | 1375 |
| 237 | P-3 | O-10 | 5 | 0 | 1375 |
| | P-3 | O-10 | 10 | 0 | 45500 |
| | P-3 | O-10 | 20 | 0 | 625 |
| | P-3 | O-10 | 40 | 0 | 510 |
| 238 | P-3 | O-11 | 5 | 0 | 36000 |

TABLE P-continued

| Example | Thickener | Solvent | Solvent Concentration (wt. %) | Solvent O-1 Concentration (wt. %) | Brookfield Viscosity (cps) @ pH = 9.0 |
|---|---|---|---|---|---|
| | P-3 | O-11 | 10 | 0 | 20500 |
| | P-3 | O-11 | 20 | 0 | 4200 |
| | P-3 | O-11 | 40 | 0 | 550 |
| 239 | P-3 | O-12 | 0 | 0 | 76000 |
| | P-3 | O-12 | 5 | 0 | 45000 |
| | P-3 | O-12 | 10 | 0 | 24500 |
| | P-3 | O-12 | 20 | 0 | 5800 |
| | P-3 | O-12 | 40 | 0 | 675 |
| | P-3 | O-12 | 5 | 5 | 51500 |
| | P-3 | O-12 | 10 | 5 | 28500 |
| | P-3 | O-12 | 20 | 5 | 7100 |
| | P-3 | O-12 | 40 | 5 | 810 |
| | P-3 | O-12 | 5 | 10 | 61200 |
| | P-3 | O-12 | 10 | 10 | 33500 |
| | P-3 | O-12 | 20 | 10 | 6400 |
| | P-3 | O-12 | 40 | 10 | 950 |
| | P-3 | O-12 | 5 | 20 | 86800 |
| | P-3 | O-12 | 10 | 20 | 40500 |
| | P-3 | O-12 | 20 | 20 | 7100 |
| | P-3 | O-12 | 40 | 20 | 1350 |
| 240 | P-14 | O-7 | 0 | 0 | 150000 |
| | P-14 | O-7 | 5 | 0 | 1350 |
| | P-14 | O-7 | 10 | 0 | 4500 |
| | P-14 | O-7 | 20 | 0 | 7000 |
| | P-14 | O-7 | 0 | 5 | 140000 |
| | P-14 | O-7 | 5 | 5 | 120000 |
| | P-14 | O-7 | 10 | 5 | 78000 |
| | P-14 | O-7 | 0 | 5 | 140000 |
| | P-14 | O-7 | 5 | 10 | 158000 |
| | P-14 | O-7 | 10 | 10 | 124000 |
| | P-14 | O-7 | 0 | 20 | 136000 |
| | P-14 | O-7 | 5 | 20 | 152000 |
| | P-14 | O-7 | 10 | 20 | 142000 |
| 241 | P-3a | O-2 | 0 | 0 | 132600 |
| | P-3a | O-2 | 5 | 0 | 17300 |
| | P-3a | O-2 | 10 | 0 | 850 |
| | P-3a | O-2 | 20 | 0 | 1425 |
| | P-3a | O-2 | 40 | 0 | 4750 |
| | P-3a | O-2 | 0 | 5 | 140000 |
| | P-3a | O-2 | 5 | 5 | 67000 |
| | P-3a | O-2 | 10 | 5 | 2500 |
| | P-3a | O-2 | 20 | 5 | 3000 |
| | P-3a | O-2 | 0 | 10 | 134000 |
| | P-3a | O-2 | 5 | 10 | 33000 |
| | P-3a | O-2 | 10 | 10 | 4000 |
| | P-3a | O-2 | 20 | 10 | 4900 |
| | P-3a | O-2 | 0 | 20 | 144000 |
| | P-3a | O-2 | 5 | 20 | 49000 |
| | P-3a | O-2 | 10 | 20 | 8000 |
| 242 | P-3a | O-3 | 5 | 0 | 28500 |
| | P-3a | O-3 | 10 | 0 | 880 |
| | P-3a | O-3 | 20 | 0 | 1425 |
| | P-3a | O-3 | 40 | 0 | 4600 |
| | P-3a | O-3 | 5 | 5 | 80000 |
| | P-3a | O-3 | 10 | 5 | 2950 |
| | P-3a | O-3 | 20 | 5 | 3200 |
| | P-3a | O-3 | 40 | 5 | 6200 |
| | P-3a | O-3 | 5 | 10 | 78000 |
| | P-3& | O-3 | 10 | 10 | 5200 |
| | P-3a | O-3 | 20 | 10 | 6400 |
| | P-3a | O-3 | 5 | 20 | 136000 |
| | P-3a | O-3 | 10 | 20 | 20500 |
| 243 | P-3a | O-4 | 5 | 0 | 94000 |
| | P-3a | O-4 | 10 | 0 | 29000 |
| | P-3a | O-4 | 20 | 0 | 1050 |
| | P-3a | O-4 | 40 | 0 | 850 |
| | P-3a | O-4 | 5 | 5 | 107400 |
| | P-3a | O-4 | 10 | 5 | 39000 |
| | P-3a | O-4 | 20 | 5 | 1225 |
| | P-3a | O-4 | 40 | 5 | 900 |
| | P-3a | O-4 | 5 | 10 | 134000 |
| | P-3a | O-4 | 10 | 10 | 41000 |
| | P-3a | O-4 | 20 | 10 | 1350 |
| | P-3a | O-4 | 40 | 10 | 1050 |
| | P-3a | O-4 | 5 | 20 | 164000 |
| | P-3a | O-4 | 10 | 20 | 33000 |
| | P-3a | O-4 | 20 | 20 | 1825 |
| | P-3a | O-4 | 40 | 20 | 1350 |
| 244 | P-3a | O-5 | 5 | 0 | 93500 |

TABLE P-continued

| Example | Thickener | Solvent | Solvent Concentration (wt. %) | Solvent O-1 Concentration (wt. %) | Brookfield Viscosity (cps) @ pH = 9.0 |
|---|---|---|---|---|---|
|  | P-3a | O-5 | 10 | 0 | 136000 |
|  | P-3a | O-5 | 20 | 0 | 178000 |
| 245 | P-3a | O-7 | 5 | 0 | 2700 |
|  | P-3a | O-7 | 10 | 0 | 6100 |
|  | P-3a | O-7 | 20 | 0 | 11900 |

Although the invention has been illustrated by certain of the preceding examples, it is not to be construed as being limited thereby; but rather, the invention encompasses the generic area as hereinbefore disclosed. Various modifications and embodiments can be made without departing from the spirit and scope thereof.

We claim:

1. A process for producing a water-soluble polymer which comprises either:
   (a) bonding (1) a functional group-containing hydrophobic reactant that has at least one complex hydrophobic group and that can have a hydrophobe bunch of at least two hydrophobic groups, complex hydrophobic groups or mixtures with (2) a water-soluble polymer reactant containing a complementary functional group whereby said hydrophobic reactant is covalently bonded to the polymer; or
   (b) interreacting (1) a functional group-containing hydrophobic reactant that has at least one complex hydrophobic group and that can have a hydrophobe bunch of at least two hydrophobic groups, complex hydrophobic groups or mixtures with (2) a complementary functional water-soluble prepolymer or monomer whereby the two are copolymerized to provide a water-soluble polymer containing said hydrophobic reactant; or
   (c) interreacting (1) a functional group-containing hydrophobic reactant that has at least one complex hydrophobic and optionally hydrophobic group with (2) a complementary functional water-soluble prepolymer whereby the two are copolymerized to provide a water-soluble polymer having at least one complex hydrophobic group and at least one hydrophobic bunch containing at least two hydrophobic groups, complex hydrophobic groups or mixtures.

2. The process of claim 1 wherein a functional connecting monomer is added having complementary functionality to the hydrophobic and water-soluble reactants to form a linking segment between the water-soluble and hydrophobic portions of the polymer.

3. A process for producing a thickened aqueous solution by providing a water solution with an effective thickening amount of a water-soluble polymer which comprises segments, each segment containing at least one hydrophobic or complex hydrophobic group covalently bonded to the polymer, wherein the polymer has an amount of complex hydrophobic groups sufficient to provide for enhanced thickening of aqueous solutions containing the polymer.

4. A process for thickening an aqueous composition comprising adding to the composition a polymer which comprises hydrophobic segments, each segment containing at least one hydrophobic group or complex hydrophobic group covalently bonded to the polymer, wherein the polymer has an amount of complex hydrophobic groups sufficient to provide for enhanced thickening of aqueous solutions containing the polymer when compared with a polymer of essentially the same structure but which has only hydrophobic groups other than complex hydrophobic groups, wherein said complex hydrophobic group is derived from a compound represented by the formula selected from:

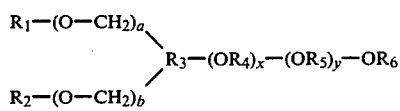

wherein $R_1$ and $R_2$ are the same or different and are hydrogen or a substituted or unsubstituted monovalent hydrocarbon residue, $R_3$ is a substituted or unsubstituted divalent or trivalent hydrocarbon residue, each $R_4$ is the same or different and is a substituted or unsubstituted divalent hydrocarbon residue, each $R_5$ is the same or different and is a substituted or unsubstituted divalent hydrocarbon residue, $R_6$ is hydrogen, a substituted or unsubstituted monovalent hydrocarbon residue or an ionic substituent a and b are the same or different and are a value of 0 or 1, and x and y are the same or different and are a value of 0 or greater; provided at least two of $R_1$, $R_2$, $R_3$, $R_4$, $R_5$ and $R_6$ are a hydrocarbon residue having greater than 2 carbon atoms in the case of $R_1$, $R_2$ and $R_6$ or having greater than 2 pendant carbon atoms in the case of $R_3$, $R_4$ and $R_5$; and

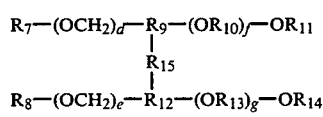

wherein $R_7$ and $R_8$ are the same or different and are hydrogen or a substituted or unsubstituted monovalent hydrocarbon residue, $R_9$ and $R_{12}$ are the same or different and are a substituted or unsubstituted divalent or trivalent hydrocarbon residue, each $R_{10}$ is the same or different and is a substituted or unsubstituted divalent hydrocarbon residue, each $R_{13}$ is the same or different and is a substituted or unsubstituted divalent hydrocarbon residue, $R_{11}$ and $R_{14}$ are the same or different and are hydrogen, a substituted or unsubstituted monovalent hydrocarbon residue or an ionic substituent, $R_{15}$ is a substituted or unsubstituted divalent hydrocarbon residue, d and e are the same or different and are a value 0 or 1, and f and g are the same or different and are a value of 0 or greater; provided at least two of $R_7$, $R_8$, $R_9$, $R_{10}$, $R_{11}$, $R_{12}$, $R_{13}$, $R_{14}$ and $R_{15}$ are a hydrocarbon residue having greater than 2 carbon atoms in the case of $R_7$, $R_8$, $R_{11}$ an $R_{14}$ or having greater than 2 pendant carbon atoms in the case of $R_9$, $R_{10}$, $R_{12}$, $R_{13}$ and $R_{15}$.

5. The process of claim 4 wherein the composition is thickened further by the addition of an effective amount of surfactant, solvent or non-solvent.

6. The process of claim 1 wherein said complex hydrophobic group is derived from a compound represented by the formula selected from:

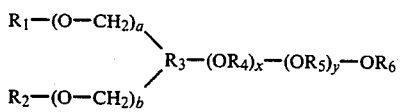

wherein $R_1$ and $R_2$ are the same or different and are hydrogen or a substituted or unsubstituted monovalent hydrocarbon residue, $R_3$ is a substituted or unsubstituted divalent or trivalent hydrocarbon residue, each $R_4$ is the same or different and is a substituted or unsubstituted divalent hydrocarbon residue, each $R_5$ is the same or different and is a substituted or unsubstituted divalent hydrocarbon residue, $R_6$ is hydrogen, a substituted or unsubstituted monovalent hydrocarbon residue or an ionic substituent, a and b are the same or different and are a value of 0 or 1, and x and y are the same or different and are a value of 0 or greater; provided at least two of $R_1$, $R_2$, $R_3$, $R_4$, $R_5$ and $R_6$ are a hydrocarbon residue having greater than 2 carbon atoms in the case of $R_1$, $R_2$ and $R_6$ or having 2 pendant carbon atoms in the case of $R_3$, $R_4$ and $R_5$; and

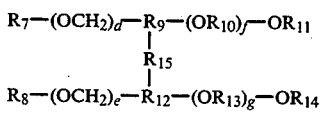

wherein $R_7$ and $R_8$ are the same or different and are hydrogen or a substituted or unsubstituted monovalent hydrocarbon residue, $R_9$ and $R_{12}$ are the same or different and are a substituted or unsubstituted divalent or trivalent hydrocarbon residue, each $R_{10}$ is the same or different and is a substituted or unsubstituted divalent hydrocarbon residue, each $R_{13}$ is the same or different and is a substituted or unsubstituted divalent hydrocarbon residue, $R_{11}$ and $R_{14}$ are the same or different and are hydrogen, a substituted or unsubstituted monovalent hydrocarbon residue or an ionic substituent, $R_{15}$ is a substituted or unsubstituted divalent hydrocarbon residue, d and e are the same or different and are a value of 0 or 1, and f and g are the same or different and are a value of 0 or greater; provided at least two of $R_7$, $R_8$, $R_9$, $R_{10}$, $R_{11}$, $R_{12}$, $R_{13}$, $R_{14}$ and R15 are a hydrocarbon residue having greater than 2 carbon atoms in the case of $R_7$, $R_8$, $R_{11}$ an $R_{14}$ or having greater than 2 pendant carbon atoms in the case of $R_9$, $R_{10}$, $R_{12}$, $R_{13}$ and $R_{15}$.

7. The process of claim 6 wherein $R_1$, $R_2$, $R_7$ and $R_8$ are selected from substituted or unsubstituted alkyl, aryl, alkylaryl, arylalkyl, cycloalkyl or mixtures thereof.

8. The process of claim 6 wherein $R_1$, $R_2$, $R_7$ and $R_8$ are selected from dodecylphenyl, nonylphenyl, octylphenyl or mixtures thereof.

9. The process of claim 6 wherein each $R_4$, $R_5$, $R_{10}$ and $R_{13}$ is selected from $-CH_2CH_2-$, $-CH_2CH(CH_3)-$ or mixtures thereof.

10. The process of claim 6 wherein the values of x, y, f and g are from 0 to about 200 or greater.

11. The process of claim 3 wherein said complex hydrophobic group is derived from a compound represented by the formula selected from:

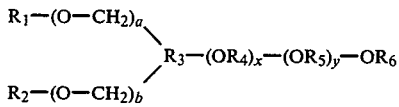

wherein $R_1$ and $R_2$ are the same or different and are hydrogen or a substituted or unsubstituted monovalent hydrocarbon residue, $R_3$ is a substituted or unsubstituted divalent or trivalent hydrocarbon residue, each $R_4$ is the same or different and is a substituted or unsubstituted divalent hydrocarbon residue, each $R_5$ is the same or different and is a substituted or unsubstituted divalent hydrocarbon residue, $R_6$ is hydrogen, a substituted or unsubstituted monovalent hydrocarbon residue or an ionic substituent, a and b are the same or different and are a value of 0 or 1, and x and y are the same or different and are a value of 0 or greater; provided at least two of $R_1$, $R_2$, $R_3$, $R_4$, $R_5$ and $R_6$ are a hydrocarbon residue having greater than 2 carbon atoms in the case of $R_1$, $R_2$ and $R_6$ or having greater than 2 pendant carbon atoms in the case of $R_3$, $R_4$ and $R_5$; and

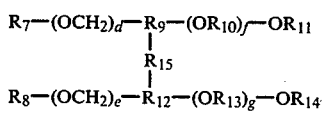

wherein $R_7$ and $R_8$ are the same or different and are hydrogen or a substituted or unsubstituted monovalent hydrocarbon residue, $R_9$ and $R_{12}$ are the same or different and are a substituted or unsubstituted divalent or trivalent hydrocarbon residue, each $R_{10}$ is the same or different and is a substituted or unsubstituted divalent hydrocarbon residue, each $R_{13}$ is the same or different and is a substituted or unsubstituted divalent hydrocarbon residue, $R_{11}$ and $R_{14}$ are the same or different and are hydrogen, a substituted or unsubstituted monovalent hydrocarbon residue or an ionic substituent, $R_{15}$ is a substituted or unsubstituted divalent hydrocarbon residue, d and e are the same or different and are a value of 0 or 1, and f and g are the same or different and are a value of 0 or greater; provided at least two of $R_7$, $R_8$, $R_9$, $R_{10}$, $R_{11}$, $R_{12}$, $R_{13}$, $R_{14}$ and $R_{15}$ are a hydrocarbon residue having greater than 2 carbon atoms in the case of $R_7$, $R_8$, $R_{11}$ an $R_{14}$ or having greater than 2 pendant carbon atoms in the case of $R_9$, $R_{10}$, $R_{12}$, $R_{13}$ and $R_{15}$.

12. The process of claim 11 wherein $R_1$, $R_2$, $R_7$ and $R_8$ are selected from substituted or unsubstituted alkyl, aryl, alkylaryl, arylalkyl, cycloalkyl or mixtures thereof.

13. The process of claim 11 wherein $R_1$, $R_2$, $R_7$ and $R_8$ are selected from dodecylphenyl, nonylphenyl, octylphenyl or mixtures thereof.

14. The process of claim 11 wherein each $R_4$, $R_5$, $R_{10}$ and $R_{13}$ is selected from $-CH_2CH_2-$, $-CH_2CH(CH_3)-$ or mixtures thereof.

15. The process of claim 11 wherein the values of x, y, f and g are from 0, to about 200 or greater.

16. The process of claim 4 wherein $R_1$, $R_2$, $R_7$ and $R_8$ are selected from substituted or unsubstituted alkyl, aryl, alkylaryl, arylalkyl, cycloalkyl or mixtures thereof.

17. The process of claim 4 wherein $R_1$, $R_2$, $R_7$ and $R_8$ are selected from dodecylphenyl, nonylphenyl, octylphenyl or mixtures thereof.

18. The process of claim 4 wherein each $R_4$, $R_5$, $R_{10}$ and $R_{13}$ is selected from $-CH_2CH_2-$, $-CH_2CH(CH_3)-$ or mixtures thereof.

19. The process of claim 4 wherein the values of x, y, f and g are from 0 to about 200 or greater.

* * * * *